US012265338B2

(12) United States Patent
Fukuda et al.

(10) Patent No.: US 12,265,338 B2
(45) Date of Patent: Apr. 1, 2025

(54) IMAGE FORMING APPARATUS HAVING CONTROLLER TO CONTROL VOLTAGE TO FIRST AND SECOND CORONA CHARGERS

(71) Applicant: CANON KABUSHIKI KAISHA, Tokyo (JP)

(72) Inventors: Tadashi Fukuda, Tokyo (JP); Hiroshi Kusukawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/496,249

(22) Filed: Oct. 27, 2023

(65) Prior Publication Data

US 2024/0142889 A1 May 2, 2024

(30) Foreign Application Priority Data

Oct. 28, 2022 (JP) ................................ 2022-173089

(51) Int. Cl.
*G03G 15/02* (2006.01)
*G03G 15/00* (2006.01)

(52) U.S. Cl.
CPC ..... *G03G 15/0266* (2013.01); *G03G 15/0216* (2013.01); *G03G 15/0291* (2013.01); *G03G 15/5004* (2013.01); *G03G 2215/026* (2013.01)

(58) Field of Classification Search
CPC ........... G03G 15/0291; G03G 15/0266; G03G 2215/026
USPC .................................................... 399/50, 171
See application file for complete search history.

(56) References Cited

U.S. PATENT DOCUMENTS

| | | | | |
|---|---|---|---|---|
| 5,659,839 A * | 8/1997 | Mizude | G03G 15/0266 399/50 |
| 7,031,628 B2 * | 4/2006 | Sekovski | G03G 15/0266 399/50 |
| 9,726,999 B2 | 8/2017 | Kitajima | |
| 2005/0226644 A1 * | 10/2005 | Ino | G03G 15/0291 399/50 |
| 2007/0160389 A1 * | 7/2007 | Zona | G03G 15/0291 399/173 |

(Continued)

FOREIGN PATENT DOCUMENTS

| | | |
|---|---|---|
| JP | 62-194267 A | 8/1987 |
| JP | 02-271370 A | 11/1990 |

(Continued)

OTHER PUBLICATIONS

U.S. Appl. No. 18/226,099, Hiroshi Kusukawa, filed Jul. 25, 2023.

*Primary Examiner* — Robert B Beatty
(74) *Attorney, Agent, or Firm* — Venable LLP

(57) ABSTRACT

An image forming apparatus includes a controller that performs a first adjusting operation and thereafter performs a second adjusting operation. In the first adjusting operation, a voltage applied to a first grid electrode by a first voltage applying portion is set so that a surface potential of an image bearing member charged by a first corona charger becomes a first target value. In the second adjusting operation, a voltage applied to a second grid electrode by a second voltage applying portion is set so that a surface potential of the image bearing member charged by the first corona charger and a second corona charger becomes a second target value whose absolute value is greater than the first target value.

7 Claims, 10 Drawing Sheets

(56) References Cited

U.S. PATENT DOCUMENTS

| | | | | |
|---|---|---|---|---|
| 2009/0052915 | A1* | 2/2009 | Claflin, Jr. | G03G 15/0266 399/172 |
| 2016/0161878 | A1 | 6/2016 | Kitajima | |
| 2018/0046122 | A1* | 2/2018 | Kitajima | G03G 15/0233 |
| 2018/0149994 | A1* | 5/2018 | Ogawara | H02M 1/08 |
| 2024/0036491 | A1* | 2/2024 | Kusukawa | G03G 15/162 |

FOREIGN PATENT DOCUMENTS

| | | | |
|---|---|---|---|
| JP | 2007-114510 | A | 5/2007 |
| JP | 2016-109793 | A | 6/2016 |

* cited by examiner

IMAGE FORMING APPARATUS HAVING CONTROLLER TO CONTROL VOLTAGE TO FIRST AND SECOND CORONA CHARGERS

BACKGROUND OF THE INVENTION

Field of the Invention

This invention relates to an image forming apparatus equipped with a charging device having a plurality of corona chargers.

Description of the Related Art

A corona charger has been widely used in an image forming apparatus as a charging portion to electrically charge a photosensitive member. Generally, a corona charger has a discharge electrode that generates electric charge by means of discharge and a grid electrode that adjusts the amount of electric charge that reaches the photosensitive member.

When such a corona charger is used to cope with a higher moving speed of the photosensitive member which is accompanied by a faster image output or to charge a photosensitive member with large capacitance, the grid electrode is often placed at a position close to the photosensitive member, for example, around 1 to 1.5 mm from the photosensitive member. This is because the placement of the grid electrode closer to the photosensitive member appropriately directs the electric charge from the discharge electrode to the photosensitive member so that the charging property is enhanced and the convergence of the surface potential of the photosensitive member can be improved.

However, the problem of unevenness of charge, in which the surface potential of the photosensitive member becomes non-uniform due to insufficient charging performance of the corona charger, can still occur. When the unevenness of charge occurs, image defects such as uneven image density and rough images caused by variations in image dots may occur. The following techniques have been proposed as measures to suppress the unevenness of charge of the surface of the photosensitive member.

The Japanese Patent Application Laid-Open No. S62-194267 discloses that two corona chargers should be placed along the direction of rotation of the photosensitive member to charge the photosensitive member twice along the direction of rotation of the photosensitive member.

The US Patent Application Publication No. US 2016/0161878 discloses the adjustment of the charging voltage applied to the upstream corona charger of the two corona chargers arranged along the direction of rotation of the photosensitive member so that the surface potential formed on the photosensitive member in the charging process by the upstream corona charger becomes a first target value. The US Patent Application Publication No. US 2016/0161878 further discloses a subsequent adjustment of the charging voltage applied to the downstream corona charger so that the surface potential formed on the photosensitive member becomes a second target value by combining the charging process by the downstream corona charger and the charging process by the upstream corona charger.

However, in the apparatus disclosed in US2016/0161878, when the charging voltage applied to the upstream corona charger is adjusted, unintended charge transfer (hereinafter referred to as leakage phenomenon) may occur between the downstream corona charger and the photosensitive member, resulting in a shift in the surface potential of the photosensitive member. In this case, the charging voltage applied to the upstream corona charger cannot be properly adjusted, which may worsen the unevenness of charge of the surface of the photosensitive member.

In detail, when a photosensitive member is charged using the upstream corona charger, the charge generated from the discharge electrode of the upstream corona charger not only flows into the photosensitive member but also leaks out of the upstream corona charger and flows into the grid electrode of the downstream corona charger. The grid electrode is a metal conductor but has circuit resistance because it is connected to the charging power supply. Therefore, the downstream grid electrode is charged by the electric charge that leaks from the upstream corona charger and flows into the grid electrode of the downstream corona charger. Then, when the potential difference between the charged downstream grid electrode and the photosensitive surface reaches a certain threshold value, a leakage phenomenon occurs between the downstream grid electrode and the photosensitive member, causing a deviation in potential on the photosensitive member surface from the first target value mentioned above. In this case, the charging voltage applied to the upstream corona charger is set based on the surface potential of the photosensitive member that has shifted due to the leakage phenomenon, which may worsen the unevenness of charge on the surface of the photosensitive member.

SUMMARY OF THE INVENTION

An object of the present invention is to suppress the unevenness of charge of a surface of a photosensitive member when the photosensitive member is charged by a charging device having a plurality of corona chargers.

A representative configuration of the present invention is an image forming apparatus comprising:

an image bearing member that is rotatable;

a charging device that charges the image bearing member by a plurality of corona chargers including a first corona charger and a second corona charger that is disposed downstream of the first corona charger with respect to a rotational direction of the image bearing member, the first corona charger including a first discharge electrode and a first grid electrode, the second corona charger including a second discharge electrode and a second grid electrode;

a first voltage applying portion that applies a voltage to the first grid electrode;

a second voltage applying portion that applies a voltage to the second grid electrode; and a controller that controls the first voltage applying portion and the second voltage applying portion, wherein the controller performs a first adjusting operation and thereafter the controller performs a second adjusting operation, wherein in the first adjusting operation, a voltage applied to the first grid electrode by the first voltage applying portion is set so that a surface potential of the image bearing member charged by the first corona charger becomes a first target value, the voltage applied to the first grid electrode by the first voltage applying portion being set in a state that a voltage is applied to the second discharge electrode and a voltage whose absolute value is smaller than the first target value is applied to the second grid electrode by the second voltage applying portion, and wherein in the second adjusting operation, a voltage applied to the second grid electrode by the second voltage applying portion is set so that a surface potential of the image bearing member charged by the first corona charger and the second corona charger becomes a second target value whose absolute value is greater than the first target value, the voltage applied to the second grid electrode by the second voltage applying portion being set in a state that a voltage is applied to the first discharge electrode and the voltage set by the first adjusting operation is applied to the first grid electrode by the first voltage applying portion.

Another representative configuration of the present invention is an image forming apparatus comprising:

an image bearing member that is rotatable;

a charging device that charges the image bearing member by a plurality of corona chargers including a first corona charger and a second corona charger that is disposed downstream of the first corona charger with respect to a rotational direction of the image bearing member, the first corona charger including a first discharge electrode and a first grid electrode, the second corona charger including a second discharge electrode and a second grid electrode;

a developing device having a developer container that accommodates developer, and a developer bearing member that bears the developer for developing an electrostatic latent image formed on the image bearing member;

a detecting portion that detects a surface potential of the image bearing member, the detecting portion being disposed downstream of a charging position where the image bearing member is charged by the charging device and upstream of a developing position where the electrostatic latent image formed on the image bearing member is developed by the developing device with respect to the rotational direction of the image bearing member;

a first voltage applying portion that applies a voltage to the first grid electrode;

a second voltage applying portion that applies a voltage to the second grid electrode; and a controller that controls the first voltage applying portion and the second voltage applying portion, wherein the controller performs a first adjusting operation and thereafter the controller performs a second adjusting operation, wherein in the first adjusting operation, a voltage applied to the first grid electrode by the first voltage applying portion is set based on the surface potential of the image bearing member detected by the detecting portion in a state that a voltage is applied to the second discharge electrode and a predetermined voltage is applied to the second grid electrode by the second voltage applying portion, wherein in the second adjusting operation, a voltage applied to the second grid electrode by the second voltage applying portion is set based on the surface potential of the image bearing member detected by the detecting portion in a state that a voltage is applied to the first discharge electrode and the voltage set by the first adjusting operation is applied to the first grid electrode by the first voltage applying portion, and wherein the absolute value of the predetermined voltage applied to the second grid electrode by the second voltage applying portion in the first adjusting operation is less than the absolute value of the voltage applied to the second grid electrode by the second voltage applying portion in the second adjusting operation.

Further features of the present invention will become apparent from the following description of exemplary embodiments with reference to the attached drawings.

DESCRIPTION OF THE EMBODIMENTS

Hereinafter, with reference to the drawings, preferable embodiments of the present invention will be described in detail. However, the dimensions, materials, shapes, and relative arrangement of the components described in the following embodiments should be changed as appropriate depending on the configuration and various conditions of the device to which the invention is applied, and it is not intended to limit the scope of the invention to them alone.

Embodiment 1

1. General Structure and Operation of Image Forming Apparatus

Figure 1:
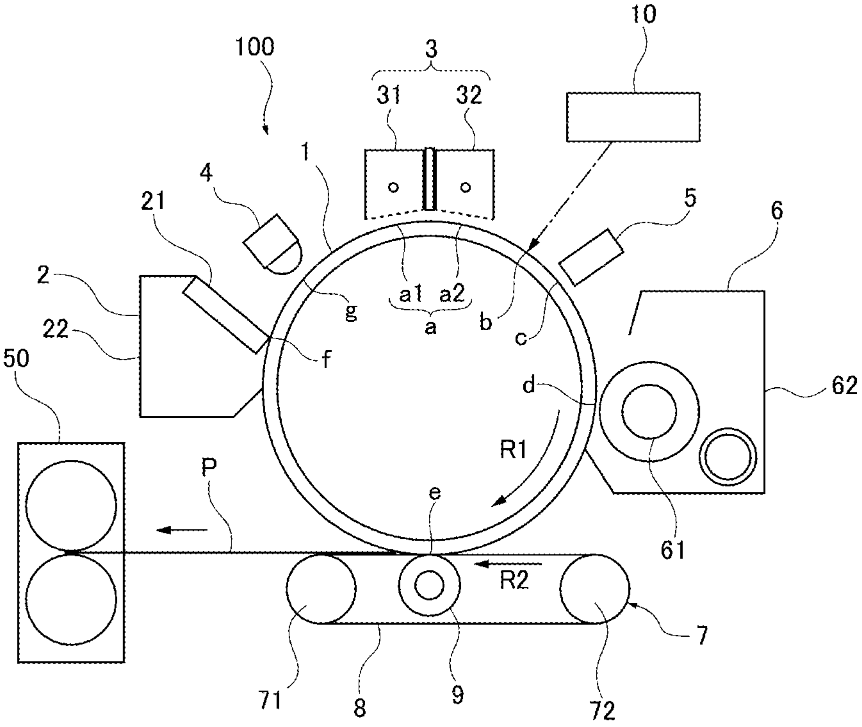
FIG. 1 is a schematic sectional view of an image forming apparatus according to Embodiment 1.

FIG. 1 is a schematic sectional view of an image forming apparatus 100 according to Embodiment 1 of the present invention. The image forming apparatus 100 in this embodiment is a laser beam printer using an electrophotographic system.

The image forming apparatus 100 includes the photosensitive drum 1 which is a drum-shaped (cylindrical) electrophotographic photosensitive member and which works as a rotatable image bearing member. The photosensitive drum 1 is rotated in the direction of the arrow R1 in FIG. 1. Around the photosensitive drum 1, along a rotational direction of the photosensitive drum 1, the following devices are provided. First, the charging device 3 is disposed as a charging portion. Next, the exposure device (laser scanner) 10 is disposed as an image exposure portion. Next, the potential sensor 5 is disposed as a surface potential detecting portion. Next, the developing device 6 is disposed as a developing portion. Next, the transfer device 7 of a transfer belt type is disposed as a transfer portion. Next, the cleaning device 2 is disposed as a cleaning portion. Next, a light charge-removing device 4 is disposed as a charge-removing portion.

The transfer device 7 includes the transfer belt 8 which is a recording material conveying member formed with a rotatable endless belt provided as opposed to the photosensitive drum 1. The transfer belt 8 is supported by the driving roller 71 and the driven roller 72 which are a plurality of supporting rollers, and a driving force is transmitted by the driving roller 71 which is rotationally driven, so that the transfer belt 8 is rotated (circulated and moved) in the direction of the arrow R2 in FIG. 1. The transfer roller 9 as a transfer member is provided at a position opposing the photosensitive drum 1 on the inner peripheral surface side of the transfer belt 8. The transfer roller 9 is urged (pressed) toward the photosensitive drum 1 via the transfer belt 8 to form the transfer portion e where the photosensitive drum 1 and the transfer belt 8 are in contact with each other.

The fixing device 50 of a heat pressing type is provided as a fixing portion on the downstream side of the transfer portion e with respect to the conveying direction of the recording material P.

During image formation, the outer peripheral surface of the rotating photosensitive drum 1 is electrically charged uniformly to a predetermined potential of a predetermined polarity (negative in this embodiment) by the charging device 3. At this time, predetermined voltages are applied to the charging device 3 from the power supplies S1, S2, S4, S5 (FIG. 2) as voltage applying portions. In this embodiment, the charging device 3 is constituted by the upstream charger 31 provided on the upstream side with respect to the rotational direction (the direction of surface movement) of the photosensitive drum 1 and the downstream charger 32 provided on the downstream side with respect to the rotational direction of the photosensitive drum 1. With respect to the rotational direction of the photosensitive drum 1, the positions on the photosensitive drum 1 where the photosensitive drum is charged by the charging device 3 are charging positions a. Specifically, with respect to the rotational direction of the photosensitive drum 1, the position where the photosensitive drum 1 is charged by the upstream charger 31 is the upstream charging position a1, and the position where the photosensitive drum 1 is charged by the downstream charger 32 is the downstream charging position a2. With respect to the direction of rotation of the photosensitive drum 1, the downstream charging position (second position) a2 on the photosensitive drum 1 to be charged by the downstream charger 32 is located downstream of and adjacent to the upstream charging position (first position) a1 on the photosensitive drum 1 to be charged by the upstream charger 31. The charging device 3 and voltages (charging voltages, charging biases) applied thereto will be described later in detail.

The surface of the photosensitive drum 1 subjected to the charging process is exposed and scanned with laser light depending on image information by the exposure device 10. As a result, an electrostatic latent image (electrostatic image) is formed on the photosensitive drum 1 depending on the image information. With respect to the rotational direction of the photosensitive drum 1, the exposure position on the photosensitive drum 1 by the exposure device 10 is an image exposure position b.

The electrostatic latent image formed on the photosensitive drum 1 is developed (visualized) with toner as developer by the developing device 6. The developing device 6 includes the developing roller 61 as a developer bearing member. The developing roller 61 bears and conveys the toner accommodated in the developing container 62, and supplies the toner to the photosensitive drum 1 depending on the electrostatic latent image. In this embodiment, a toner image is formed by image portion exposure and reverse development. That is, the toner charged to the same polarity as the charge polarity of the photosensitive drum 1 is attached to the image portion at which the absolute value of a potential is lowered by being exposed with light after the photosensitive drum 1 is uniformly charged. During development, a predetermined developing voltage (developing bias) is applied to the developing roller 61 from an unshown developing power supply. With respect to the rotational direction of the photosensitive drum 1, the position on the photosensitive drum 1 opposing the developing roller 61 is the developing position d where the toner is supplied from the developing roller 61.

At the transfer portion e, the toner image formed on the photosensitive drum 1 is electrostatically transferred onto the recording material P such as recording paper which is borne on the transfer belt 8 and which is nipped and conveyed by the photosensitive drum 1 and the transfer belt 8. At this time, a transfer voltage (transfer bias) which is a DC voltage of an opposite polarity to a (normal) charge polarity of the toner during the development is applied to the transfer roller 9 from an unshown transfer power supply. With respect to the rotational direction of the photosensitive drum 1, the position of contact of the photosensitive drum 1 with the transfer belt 8 is the transfer position e where the toner image is transferred.

The recording material P on which the toner image is transferred is separated from the transfer belt 8 and then is conveyed to the fixing device 50. The fixing device 50 conveys the recording material P while heating and pressing the recording material P, so that the toner image is fixed on the recording material P. After that, the recording material P is discharged to the outside of the apparatus main body of the image forming apparatus 100.

The toner (transfer residual toner) remaining on the photosensitive drum 1 after the transfer step is removed and collected from the photosensitive drum 1 by the cleaning device 2. The cleaning device 2 includes the cleaning blade 21 as a cleaning member provided in contact with the photosensitive drum 1 and includes the collecting container 22 in which the toner scraped off from the rotating photosensitive drum 1 by the cleaning blade 21 is collected. With respect to the rotational direction of the photosensitive drum 1, the position of contact of the photosensitive drum 1 with the cleaning blade 21 is the cleaning position f.

The photosensitive drum 1 subjected to the cleaning of the cleaning device 2 is irradiated with light (charge-removing light) by the light charge-removing device 4 to remove a residual electric charge. After that, the photosensitive drum 1 is electrically charged again by the charging device 3. With respect to the rotational direction of the photosensitive drum 1, the position where the photosensitive drum 1 is exposed to the light by the light charge-removing device 4 is the charge-removing position g.

The potential sensor 5 detects a surface potential of the photosensitive drum 1 in a charging voltage adjusting operation, which will be specifically described later. The potential sensor 5 is disposed opposed to the surface of the photosensitive drum 1 so as to be capable of detecting the surface potential of the photosensitive drum 1 in an image formable region (region where the toner image can be formed) with respect to a longitudinal direction of the photosensitive drum 1. In this embodiment, with respect to the rotational direction of the photosensitive drum 1, the potential sensor 5 detects the surface potential of the photosensitive drum 1 between the charging position a (particularly, the downstream charging position a2) and the developing position d (specifically, between the image exposure position b and the developing position d). With respect to the rotational direction of the photosensitive drum 1, the position where the surface potential of the photosensitive drum 1 is detected by the potential sensor 5 is the potential detecting position c.

In this embodiment, the wavelength of the exposure light of the exposure device 10 for forming an image is 675 nm. Further, in this embodiment, the exposure amount of the surface of the photosensitive drum 1 of the exposure device 10 is variable in the range from 0.1 to 0.5 $\mu J/cm^2$, and a predetermined potential for the exposed portion can be formed by adjusting the exposure amount depending on developing conditions.

In this embodiment, the wavelength of the charge-removing light of the light charge-removing device 4 is 635 nm. In this embodiment, an LED chip array is used as a light source for the light charge-removing device 4. The exposure amount of the light charge-removing device 4 to the surface of the photosensitive drum 1 is adjustable in the range from 1.0 to 7.0 $\mu J/cm^2$. In this embodiment, the exposure amount is set to 4.0 $\mu J/cm^2$.

2. Photosensitive Drum

The photosensitive drum 1 is supported rotatably by the apparatus main body of the image forming apparatus 100. The photosensitive drum 1 is a cylindrical photosensitive member constituted by an electroconductive base of aluminum or the like and a photoconductive layer formed on an outer peripheral surface of the base. The photosensitive drum 1 is rotationally driven in the direction of the arrow R1 in FIG. 1 by a driving portion (not shown).

In this embodiment, the charging polarity of the photosensitive drum 1 is negative. In this embodiment, the photosensitive drum 1 is an organic photoconductor (OPC) of 84 mm in outer diameter. In this embodiment, the photosensitive layer of the photosensitive drum 1 is 40 μm in thickness. Further, in this embodiment, the peripheral speed of the photosensitive drum 1 is 700 mm/s. The photosensitive drum 1 may also be another photosensitive member such as an amorphous silicon drum.

3. Configuration of Charging Device

Figure 2:
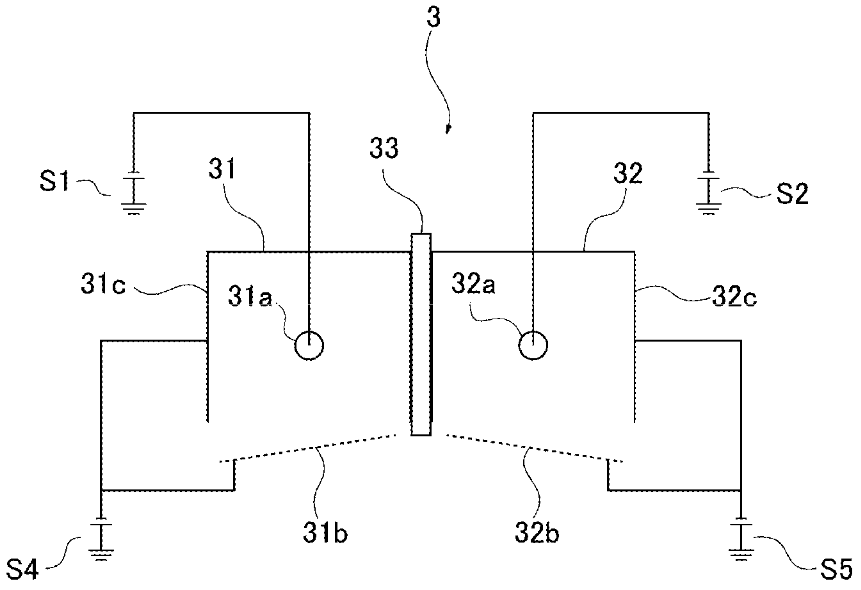
FIG. 2 is a schematic sectional view of a charging device according to the Embodiment 1.

FIG. 2 is a schematic sectional view of the charging device 3 in this embodiment. The charging device 3 has a plurality of corona chargers. More specifically, the charging device 3 is constituted by the upstream charger 31 and the downstream charger 32 which are scorotron chargers. With respect to the rotational direction of the photosensitive drum 1, the upstream charger 31 and the downstream charger 32 are disposed from an upstream side toward a downstream side in this order. The upstream charger 31 and the downstream charger 32 have substantially the same configuration as each other. The upstream charger 31 and the downstream charger 32 respectively have the discharge wires (wire electrodes, discharge electrodes) 31*a* and 32*a*, the grid electrodes 31*b* and 32*b*, and the shield electrodes 31*c* and 32*c*. Incidentally, in the following description, elements and various parameters for each of the upstream charger 31 and the downstream charger 32 are distinguished from each other by adding the prefix "upstream" or "downstream" in some cases.

In the charging device 3 in this embodiment, the upstream charger 31 is a first corona charger that charges the photosensitive drum 1 at the first position. The downstream charger 32 is a second corona charger that charges the photosensitive drum 1 at the second position adjacent to and downstream of the first position in the direction of rotation of the photosensitive drum 1.

Each of the discharge wires 31*a*, 32*a* is constituted by an electroconductive wire linearly disposed along a longitudinal direction (direction of the rotational axis) of the photosensitive drum 1. Each of the grid electrodes 31*b*, 32*b* is constituted by an electroconductive flat plate-like member that has a plurality of openings and which is disposed along the longitudinal direction of the photosensitive drum 1 between the corresponding discharge wire 31*a* or 32*a* and the photosensitive drum 1. Each of the shield electrodes 31*c*, 32*c* is formed to surround the corresponding discharge wire 31*a* or 32*a* and is constituted by an electroconductive substantially box-like member provided with an opening on an opposing side to the photosensitive drum 1 where the corresponding grid electrode 31*b* or 32*b* is disposed.

The insulating member 33 is disposed between the upstream charger 31 and the downstream charger 32 for preventing generation of leakage when different biases are applied to the upstream shield electrode 31*c* and the downstream shield electrode 32*c*. In this embodiment, an insulating plate constituted by an electrically insulating material of about 2 mm in thickness T (with respect to a tangential direction of the photosensitive drum 1 in FIG. 3) is used as the insulating member 33.

Figure 3:
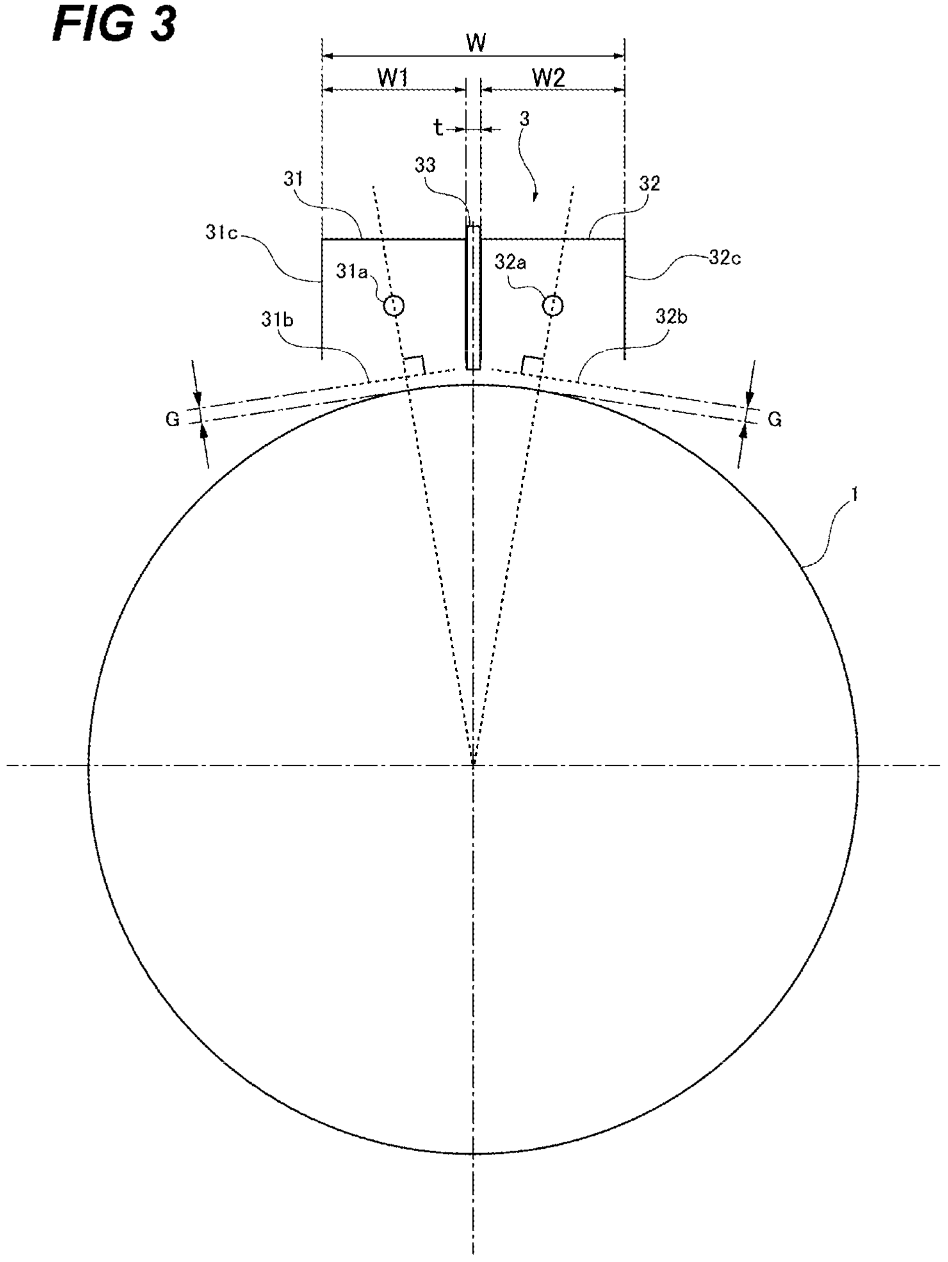
FIG. 3 is a schematic view showing an arrangement of grid electrodes of the charging device according to the Embodiment 1.

The charging device 3 is 42 mm in width W (with respect to the tangential direction of the photosensitive drum 1 in FIG. 3) and is 340 mm in length with respect to a longitudinal direction of a discharge region (with respect to the longitudinal direction of the photosensitive drum 1) for an image. The upstream charger 31 and the downstream charger 32 have the widths W1 and W2 that are of the same value of 20 mm with each other with respect to the tangential direction of the photosensitive drum 1 in FIG. 3.

Each of the discharge wires 31*a*, 32*a* is constituted by a tungsten wire subjected to oxidation and which is 60 μm in wire diameter (outer diameter) and is used in an electrophotographic image forming apparatus in general.

The grid electrodes 31*b*, 32*b* have a plate-like shape. As shown in FIG. 3, each of the upstream grid electrode 31*b* and the downstream grid electrode 32*b* is disposed along the circumference of the photosensitive drum 1 such that those grid electrodes have different angles (inclination angles). In a cross-section substantially perpendicular to the longitudinal direction of the photosensitive drum 1, an arrangement angle of each of the grid electrodes 31*b*, 32*b* is a substantially right angle with respect to a straight line connecting the corresponding discharge wire 31*a* or 32*a* with the rotation center of the photosensitive drum 1. Each of the grid electrodes 31*b*, 32*b* is disposed with the closest gap G to the photosensitive drum 1 of 1.25±0.2 mm.

The upstream grid electrode 31*b* has an aperture ratio of 90%, and the downstream grid electrode 32*b* has an aperture ratio of 80%. Each of the grid electrodes 31*b*, 32*b* is a mesh-shaped grid electrode subjected to etching. Each of the grid electrodes 31*b*, 32*b* is constituted by an SUS (stainless steel) plate and that has a surface layer formed as an anti-corrosive layer such as a nickel-plated layer and is used in general for electrophotography. Incidentally, it is not necessary that the aperture ratios of the grid electrodes 31*b*, 32*b* of the upstream charger 31 and the downstream charger 32 are different from each other, and the grid electrodes with the same configuration may be used between the plurality of chargers by using the grid electrodes having the same aperture ratio.

4. Voltage Application to Charging Device

As shown in FIG. 2, the upstream discharge wire 31*a* and the downstream discharge wire 32*a* are connected to the upstream discharge power supply S1 and the downstream discharge power supply S2, respectively, which are DC power supplies (high-voltage power supplies), so that voltages applied to the discharge wires 31*a*, 32*a* can be independently controlled. The upstream grid electrode 31*b* and the downstream grid electrode 32*b* are connected to the upstream grid power supply S4 and the downstream grid power supply S5, respectively, which are DC power supplies, so that voltages applied to the grid electrodes 31*b* and 32*b* can be independently controlled.

In this embodiment, the upstream discharge power supply S1, the downstream discharge power supply S2, the upstream grid power supply S4, and the downstream grid power supply S5 as voltage applying portions are configured as separate power supplies. However, the invention is not limited to this configuration and one single power supply that provides the voltages to be applied to the upstream discharge wire 31*a* and the downstream discharge wire 32*a* and the voltages to be applied to the upstream grid electrode 31*b* and the downstream grid electrode 32*b* can be used if these voltages are independently controlled.

The upstream shield electrode 31*c* and the downstream shield electrode 32*c* are connected with the upstream grid electrode 31*b* and the downstream grid electrode 32*b*, respectively. Therefore, in this embodiment, in the upstream charger 31 and the downstream charger 32, the shield electrodes 31*c* and 32*c* respectively have the same potentials as those of the grid electrodes 31*b* and 32*b*. However, each of the shield electrodes 31*c* and 32*c* may be electrically grounded by being connected to, e.g., the ground electrode of the apparatus main body of the image forming apparatus 100 without being made equipotential to the corresponding grid electrode 31*b* or 32*b*. It suffices that the voltages applied to the upstream charger 31 and the downstream charger 32 can be independently controlled and that in the upstream charger 31 and the downstream charger 32, the voltages applied to the discharge wires 31*a*, 32*a*, and the grid electrodes 31*b*, 32*b* can respectively be independently controlled.

Figure 4:
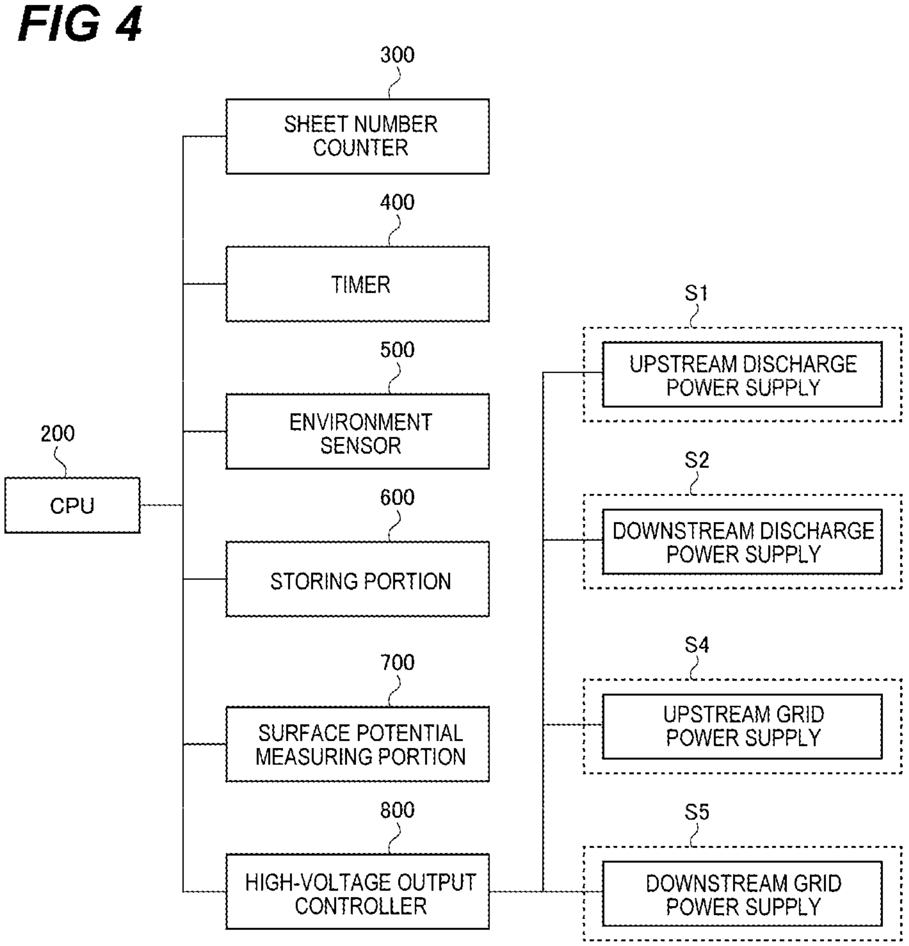
FIG. 4 is a block diagram of a control circuit for controlling a charging voltage according to the Embodiment 1.

FIG. 4 is a block diagram showing control of the charging voltages in this embodiment. As shown in FIG. 4, the power supplies S1, S2, S4, and S5 are connected to the CPU 200 as a controller. Further, the sheet number counter 300, the timer 400, the environment sensor 500, the storing portion 600, the surface potential measuring portion 700, the high-voltage output controller 800 and the like are connected to the CPU 200. The sheet number counter 300 counts the number of sheets subjected to image output by the image forming apparatus 100. The timer 400 measures an elapsed time from a reference point of time. The environment sensor 500 measures temperatures and humidities of the air inside and outside the image forming apparatus 100. The storing portion 600 records control data of the charging voltages and a measurement result of the surface potential of the photosensitive drum 1. The surface potential measuring portion 700 processes a detection result of the potential sensor 5 (sensor output) and provides the CPU 200 with information showing the measurement result. The high-voltage output controller 800 controls ON/OFF of outputs of the power supplies S1, S2, S4, and S5 and output values of these power supplies under control of the CPU 200.

The CPU 200 performs the processing described later on the basis of pieces of information from the sheet number counter 300, the timer 400, the environment sensor 500, the storing portion 600 and the surface potential measuring portion 700, and provides instructions to the high-voltage output controller 800 to control the power supplies S1, S2, S4, and S5.

In this embodiment, the DC voltages applied to the discharge wires 31*a*, 32*a* are subjected to constant-current control so that the currents are changeable in the range of 0 to −3200 μA. Further, in this embodiment, the DC voltage applied to the grid electrodes 31*b*, and 32 are subjected to constant-voltage control so that the voltages are changeable in the range of 0 to ~1200 V.

5. Control of Surface Potential of Photosensitive Drum

In this embodiment, the voltages applied to the plurality of chargers 31 and 32 of the charging device 3 can be independently controlled. In addition, in this embodiment, a charging voltage is adjusted such that the voltages applied to the chargers of the charging device 3 are independently controlled in the order of the upstream charger 31 and the downstream charger 32 and the surface potentials formed on the photosensitive drum 1 are successively superimposed (combined). As a result, a final desired surface potential (charge potential, dark-portion potential) of the photosensitive drum 1 is controlled.

That is, in the charging voltage-adjusting operation of this embodiment, first, the voltage applied to the upstream charger 31 is independently controlled to electrically charge the photosensitive drum 1, so that a predetermined surface potential (first target potential, first target value) is formed on the photosensitive drum 1. Then, in a state in which a voltage controlled so as to form the predetermined surface potential is applied to the upstream charger 31, the voltage applied to the downstream charger 32 is independently controlled to further charge the photosensitive drum 1. As a result, the surface potential formed by the downstream charger 32 is superimposed on (combined with) the surface potential formed by the upstream charger 31, so that the final desired surface potential (second target potential, second target value) of the photosensitive drum 1 is formed.

The set values of the charging high voltage applied to the discharge wires and the grid electrodes of the upstream charger 31 and downstream charger 32 are determined by controlling the surface potential of the photosensitive drum, which is described below. Image formation is performed using the set values of the charging high voltage determined by the control of the surface potential of the photosensitive drum.

In the following description, parameters as to the charging process by the upstream charger 31 are represented by adding the suffix “(U)”, and parameters as to the charging process by the downstream charger 32 are represented by adding the suffix “(S)”. Further, parameters at the potential detecting position c are represented by adding the suffix “sens”, and parameters at the developing position d are represented by adding the suffix “dev”. Further, magnitude relationships of the voltages, the currents and the potentials will be described in terms of absolute values. For example, "−400 V or more" includes, e.g., the case of "−500 V".

5-1. Charging Process and Surface Potential Control by Upstream Charger

First, the charging process by the upstream charger 31 will be described. The upstream charger 31 charges the photosensitive drum 1 with the upstream discharge current (DC current) Ip (U) flowing from the upstream discharge power supply S1 to the discharge wire 31*a* in a state in which the predetermined upstream grid voltage Vg (U) is applied from the upstream grid power supply S4 to the upstream grid electrode 31*b*.

The surface potential formed on the photosensitive drum 1 varies according to the upstream grid voltage Vg (U) of the upstream charger 31. The upstream grid voltage Vg (U) is adjusted and set such that the surface potential of the photosensitive drum 1 becomes a predetermined target value (first target value). When the upstream discharge current Ip (U) is constant, the ratio of the upstream grid voltage Vg (U) to the surface potential of the photosensitive member at the potential detection position c is almost constant. This ratio is hereinafter referred to as the upstream charging efficiency (charging efficiency Veff (U) of the upstream charger 31).

A specific example will be considered in which when the upstream grid voltage Vg (U) is −800 V and the upstream discharge current Ip (U) is −1200 μA, the surface potential of the photosensitive drum 1 is −600 V at the potential detection position c and −550 V at the developing position d. In this case, the charging efficiency Veff (U) of the upstream charger 31 is the ratio of the upstream grid voltage Vg (U) (=−800 V) to the surface potential (=−600 V) of the photosensitive drum 1 at the potential detection position c ((the surface potential of the photosensitive member at the potential detection position c)/(the upstream grid voltage Vg (U)×100%)). Therefore, the charging efficiency Veff (U) of the upstream charger 31 is calculated to be 75% (=−600/−800×100%).

The charging efficiency Veff (U) of the upstream charger 31 varies according to the state of the charger, such as the distance between the grid electrode 31*b* and the photosensitive drum 1, and the surface resistance of the grid electrode 31*b*. In the short term, however, the charging efficiency is almost constant regardless of the upstream grid voltage Vg (U). Therefore, once the charging efficiency Veff (U) of the upstream charger 31 is measured, the data are stored in the storing portion 600. Using that charging efficiency data, the grid voltage is adjusted to set the surface potential of the photosensitive drum 1 to the target potential.

Figure 5:
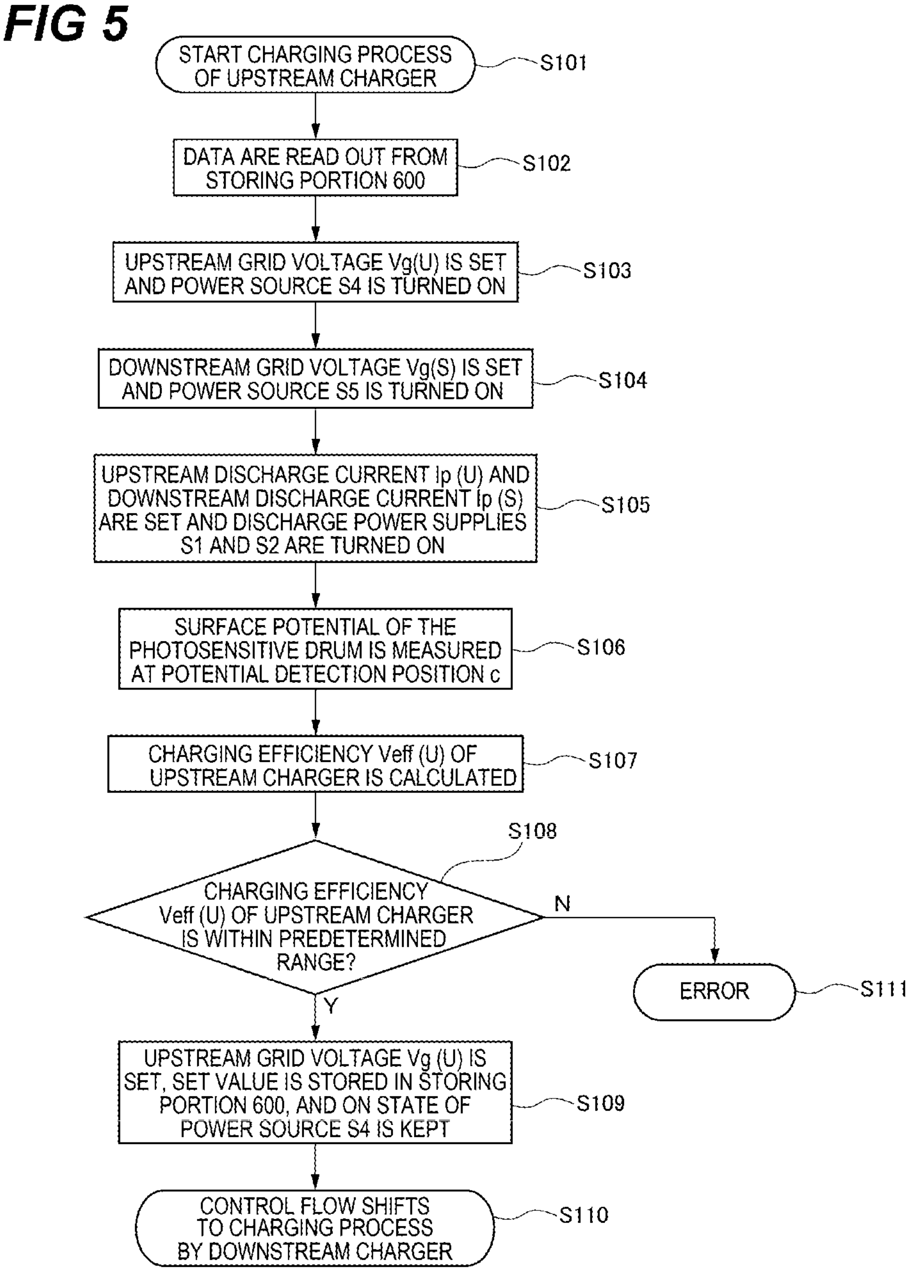
FIG. 5 is a flowchart showing a procedure of a control operation of a photosensitive drum surface potential by the upstream charger according to the Embodiment 1.

FIG. 5 is a flowchart for controlling the surface potential of the photosensitive drum 1 using the upstream charger 31. The method of adjusting the surface potential to the target potential will be described below using FIG. 5. First, the photosensitive drum 1 is driven to start charging process of the upstream charger 31 (step S101).

Next, to calculate the setting of the upstream charger 31, the storing portion 600 is checked if there are data on the charging efficiency Veff (U) of the upstream charger 31 in the past, and if so, the latest charging efficiency Veff (U) of the upstream charger 31 is read out (step S102).

A value for charging efficiency is predetermined in order to properly perform the charging process of the upstream charger 31 for cases where the control has never been performed and the charging efficiency Veff (U) of the upstream charger 31 has not been stored in the storing portion 600.

By using the data, the value of the upstream grid voltage Vg (U) is determined and the upstream grid power supply S4 is turned on (step S103). For example, assuming that the target potential (first target value) of the photosensitive drum 1 of the upstream charger 31 in this embodiment is −750 V and the latest charging efficiency Veff (U) of the upstream charger 31=73%, the upstream grid voltage Vg (U) is calculated to be −1027V by using the equation: the upstream grid voltage Vg (U)=the target potential of the photosensitive drum 1/(the latest charging efficiency Veff (U) of the upstream charger/100%).

If the upstream discharge current Ip (U) is set in this state and charging of the upstream charger 31 is started, the charge generated from the upstream discharge wire 31*a* not only charges the photosensitive drum 1 along the direction of rotation, but also flows toward the downstream charger 32, as previously described in the problem of the related art. The charge that flows in charges the downstream grid electrode 32*b* in particular. When the potential of the downstream grid electrode 32*b* charged by the charge that flows in exceeds a certain threshold value, a leakage phenomenon occurs between the downstream grid electrode 32*b* and the photosensitive drum 1, causing a shift in the surface potential of the photosensitive drum 1 charged by the upstream charger 31.

Therefore, in this embodiment, the absolute value of the downstream grid voltage Vg (S) is set to 150 V less than the absolute value of the target potential (first target value) of the photosensitive drum 1 by the upstream charger 31 alone, and the downstream grid power supply S5 is turned on. Namely, during the first adjusting operation shown in FIG. 5, the CPU 200 applies the upstream grid voltage Vg (U) to the upstream charger 31 and also applies the downstream grid voltage Vg (S) to the grid electrode 32*b* of the downstream charger 32, which is smaller than the absolute value of the target potential (first target value) of the photosensitive drum 1 by the upstream charger 31 alone. In this case, the target potential (first target value) of the photosensitive drum 1 by the upstream charger 31 alone is −750V, and the downstream grid voltage Vg (S) is set to −600V. Namely, the absolute value of the downstream grid voltage Vg (S) is set to 150 V less than the absolute value of −750 V, which is the target potential (first target value) of the photosensitive drum 1 by the upstream charger 31 alone. The downstream grid power supply S5 is then turned on (step S104).

Since there is only a very short period of time between the upstream grid power supply S4 being turned on at the step S103 and the downstream grid power supply S5 being turned on at the step S104, it is considered that both power supplies S4 and S5 are turned on substantially at the same time. Alternatively, such a configuration can be adopted that the downstream grid voltage is set and the power supply S5 is turned on at the step S103 and thereafter the upstream grid voltage is set and the power supply S4 is turned on at the step S104.

The absolute value of the downstream grid voltage Vg (S) is set to be 150 V less than the absolute value of the target potential of the photosensitive drum 1 formed by the upstream charger 31 alone. Namely, the downstream grid voltage Vg (S) is set to a value that is smaller in absolute value than the surface potential of the photosensitive drum 1 formed by the upstream charger 31. The downstream grid voltage Vg (S) is set such that (the absolute value of the surface potential of the photosensitive drum 1 formed by the upstream charger 31)>(the absolute value of the downstream grid voltage Vg (S)).

The reason why the downstream grid voltage Vg (S) is set (determined) based on the above relationship is to prevent the surface potential of the photosensitive drum 1 formed by the upstream charger 31 from being additionally charged by the downstream charger 32.

Otherwise, the surface potential of the photosensitive drum 1 formed by the upstream charger 31 is additionally charged by the downstream grid voltage Vg (S) of the downstream charger 32, and the surface potential of the photosensitive drum 1 formed by the upstream charger 31 deviates from the target potential (first target value) of the photosensitive drum 1. In such case, the charging potential of the photosensitive drum 1 formed by the upstream charger 31 cannot be measured and the upstream grid voltage Vg (U) cannot be adjusted.

Therefore, the absolute value of the downstream grid voltage Vg (S) must be set to a value smaller than the absolute value of the surface potential (first target value) of the photosensitive drum 1 formed by the upstream charger 31.

The upstream grid voltage Vg (U) of the upstream charger 31 and the surface potential of the photosensitive drum 1 formed by the upstream charger 31 have the relationship in which (the absolute value of the upstream grid voltage Vg (U))>(the absolute value of the surface potential of the photosensitive drum 1). Therefore, it is preferable to set the downstream grid voltage Vg (S) to satisfy Relationship 1 in which (the absolute value of the upstream grid voltage Vg (U))>(the absolute value of the downstream grid voltage Vg (S)).

It is more preferable to set the downstream grid voltage Vg (S) to satisfy Relationship 2 in which (the absolute value of the surface potential of the photosensitive drum 1 formed by the upstream charger 31)>(the absolute value of the downstream grid voltage Vg (S)).

The surface potential of the photosensitive drum 1 formed by the upstream charger 31 varies due to individual differences in the upstream charger 31, such as the distance between the upstream grid electrode **31*b* and the photosensitive drum 1 (gap G). Therefore, it is much more preferable to set the downstream grid voltage Vg (S) to satisfy Relationship 3 in which (the upstream grid voltage Vg (U)×the absolute value of the charging efficiency Veff (U) of the upstream charger 31**)>(the absolute value of downstream grid voltage Vg (S)).

However, the charging efficiency Veff (U) of the upstream charger (which is included in the relationship 3) fluctuates depending on usage conditions and must be constantly updated to the latest value, which could lead to the control becoming complicated. Therefore, in this embodiment, taking control simplification into consideration, the downstream grid voltage Vg (S) is set to satisfy Relationship 4 in which ((the absolute value of the target potential (first target value) of the photosensitive drum 1 by the upstream charger 31 alone) −150 V)>(the absolute value of the downstream grid voltage Vg (U)).

Table 1 below shows the results of examining whether the surface potential of the photosensitive drum 1 formed by the upstream charger 31 shifts from the target potential (first target value) depending on the downstream grid voltage Vg (S) of the downstream charger 32. In Table 1, the case where the downstream grid voltage Vg (S) is set to satisfy Relationship 0 in which (the absolute value of the downstream grid voltage Vg (S))>(the absolute value of the upstream grid voltage Vg (U)) is added for comparison with the aforementioned Relationships 1 to 4.

TABLE 1

| SETTING OF DOWNSTREAM GRID VOLTAGE | INFLUENCE TO DRUM POTENTIAL |
|---|---|
| Relationship 0 | BAD |
| Relationship 1 | AVERAGE |
| Relationship 2 | GOOD |
| Relationship 3 | EXCELLENT |
| Relationship 4 | EXCELLENT |

When the downstream grid voltage Vg (S) is set to satisfy Relationship 0, the surface potential of the photosensitive drum 1 deviates from the target potential. Therefore, the influence on the surface potential of photosensitive drum 1 is indicated as "BAD" in Table 1.

When the downstream grid voltage Vg (S) is set to Relationship 1, the surface potential of the photosensitive drum 1 is sometimes influenced although only by a few volts depending on the states of the upstream charger 31. Therefore, the influence on the surface potential of the photosensitive drum 1 is indicated as "AVERAGE".

When the downstream grid voltage Vg (S) is set to satisfy Relationship 2, the surface potential of the photosensitive drum 1 is sometimes influenced, although slightly with probability of 0.00004% in the mass production variation. However, when the downstream grid voltage Vg (S) is set to satisfy Relationship 2, there is no influence on the surface potential of the photosensitive drum 1 in most cases. Namely, when the downstream grid voltage Vg (S) is set to satisfy Relationship 2, the surface potential of the photosensitive drum 1 does not deviate from the target potential in most cases. Therefore, the influence on the surface potential of the photosensitive drum 1 is indicated as "GOOD". The mass production variation refers to the variation that occurs when a fixed quantity of products is produced (mass production) in a fixed time period.

When the downstream grid voltage Vg (S) is set to satisfy Relationship 3 or Relationship 4, there is no influence on the surface potential of the photosensitive drum 1 in all cases, including the above-mentioned mass production variation. Namely, when the downstream grid voltage Vg(S) is set to satisfy Relationship 3 or Relationship 4, the surface potential of the photosensitive drum 1 does not deviate from the target potential. Therefore, the influence on the surface potential of photosensitive drum 1 is indicated as "EXCELLENT".

The target potential of the photosensitive drum 1 is assumed to include the range ±a predetermined potential with reference to the target potential. Therefore, when the downstream grid voltage Vg (S) is set to satisfy Relationship 2, 3, or 4, the fact that the surface potential of photosensitive drum 1 does not deviate from the target potential means that it does not deviate from the range ±a predetermined potential with respect to the target potential.

Based on Relationships 0 to 4, the value of the downstream grid voltage Vg (S) is determined for setting the upstream grid voltage Vg (U) of the upstream charger 31.

Next, the downstream discharge current Ip (S) is set to −600 μA (step S105), since the downstream grid voltage Vg (S) can be stably controlled at −600 V even with the influence of charge flow from the upstream charger 31. If the absolute value of the downstream discharge current Ip (S) is small, the downstream grid voltage Vg (S) cannot be controlled stably, so the set value is determined by verifying in advance the possible range in which the downstream grid voltage Vg (S) can be stably controlled. If the absolute value of the downstream discharge current Ip (S) is large, the amount of generated ozone increases when high voltage is applied, which has a deteriorating effect on the life of the downstream grid electrode and the discharge wire. Therefore, the downstream discharge current Ip (S) is set to a value with a smaller absolute value selected from a previously verified range in which the downstream grid voltage Vg (S) can be stably controlled. In step S105, the upstream discharge current Ip (U) is set to −1200 μA.

When charging the photosensitive drum 1 only with the upstream charger 31, the influence of a charge flow from the upstream charger 31 can be prevented by using a state similar to the one in which the downstream grid voltage Vg (S) is applied without a resistance component as shown below.

For example, the downstream grid voltage Vg (S) may be set to a value that makes the photosensitive drum 1's target potential equal to 0 (zero) V so that the effect is equivalent to grounding the downstream grid electrode 32*b* of the downstream charger 32 to earth. When charging the photosensitive drum 1 only with the upstream charger 31, setting the downstream grid voltage Vg (S) in this manner can prevent the flow of charge from the upstream charger 31.

The set value of the downstream grid voltage Vg (S) set in the step S104 is to prevent leakage phenomenon and is different from the one applied during image formation.

As described above, the upstream grid voltage Vg (U) of the upstream charger 31 is set to −1027V and the upstream grid power supply S4 is turned on (step S103). The downstream grid voltage Vg (S) of the downstream charger 32 is set to −600V and the downstream grid power supply S5 is turned on (step S104). The upstream discharge current Ip (U) and the downstream discharge current Ip (S) are set to −1200 μA and −600 μA, respectively, and the discharge power supplies S1 and S2 are turned on (step S105).

With the power supplies S1, S2, S4 and S5 turned on at the above settings for the discharge wires 31*a* and 32*a* and the grid electrode 31*b* and 32*b* in the chargers 31 and 32, respectively, the surface potential of the photosensitive drum 1 is measured at the potential detection position c by the potential sensor 5 (step S106). As a result, for example, the surface potential of the photosensitive drum at the potential detection position c is measured to be −770 V.

The surface potential of the photosensitive drum 1 at the potential detection position c is measured for one lap of the photosensitive drum 1 to reduce the effect of uneven surface potential in the circumferential direction of the photosensitive drum 1, and the average value excluding the maximum and minimum values is determined as a measured value at the potential detection position c. If measurement is restricted because it takes too much time to measure one lap of the photosensitive drum, or the number of data measurement points is large, or if uneven surface potential in the circumferential direction of the photosensitive drum 1 must be considered, the number of measurement points at the potential detection position c can be adjusted accordingly.

If uneven surface potential in the circumferential direction of the photosensitive drum 1 should be considered, the measurement is made by linking the positions in the rotational direction of the photosensitive drum with the measurement points.

In this state, the charging efficiency Veff (U) of the upstream charger 31 is calculated (step S107) by the following equation: (the surface potential of the photosensitive member at the potential detection position c)/(the upstream grid voltage Vg (U)×100%). Then, the charging efficiency Veff (U) of the upstream charger 31 is obtained as 75% by the calculation: −770/−1027×100%.

Next, the judgment of an error due to malfunction is made (step S108) based on whether the calculated charging efficiency Veff (U) of the upstream charger 31 is within a predetermined range (55 to 100% in this embodiment). If the charging efficiency Veff (U) of the upstream charger 31 is less than 55% or greater than 100%, it is assumed that one of the charging device 3, the photosensitive drum 1, and the exposure device 10 malfunctions. Therefore, if the charging efficiency Veff (U) of the upstream charger 31 falls outside the range of 55 to 100% in the step S108, the error judgment condition is met and the control of the surface potential of the photosensitive drum 1 is stopped, and the error is displayed on the user interface of the image forming apparatus 100 (step S111). By performing error judgment at the step S108, it is possible to prevent the power supply from being damaged by setting too large an absolute value for the grid electrode and to prevent defective images from being generated due to the surface potential of the photosensitive drum being set to an inappropriate value.

Next, the upstream grid voltage Vg (U) is calculated for setting the target potential of the photosensitive drum 1 of the upstream charger 31 to −750 V using the charging efficiency Veff (U) (=75%) of the upstream charger 31 calculated in the step S107. The value of the upstream grid voltage Vg (U) is obtained as −1000 V by the calculation: −750/(75/100) using the equation: the upstream grid voltage Vg (U)=(the target potential of the photosensitive drum 1)/(the latest charging efficiency Veff (U) of the upstream charger/100%) (step S109). In the step S109, the upstream grid voltage Vg (U) is set to the value calculated as described above. The reset value of the upstream grid voltage is stored in the storing portion 600. At this time, the power supply S4 remains ON. In this way, the set values of the upstream discharge current Ip (U) and the upstream grid voltage Vg (U) of the upstream charger 31 are determined.

The step to check if the upstream grid voltage Vg (U) set in the step S109 conforms to the target potential of the photosensitive drum 1 formed by the upstream charger 31 may be included in the control flow. However, the inventors' preliminary study reveals that when the upstream grid voltage Vg (U) is set by the steps S103 to S109 using the charging efficiency described above, the surface potential of the photosensitive drum 1 can be set almost within the target potential ±3 V with a single control flow of the steps S103 to S109. Therefore, in this embodiment, the control flow proceeds to the control flow of charging process and surface potential by the downstream charger 32 without measuring the surface potential of the photosensitive drum 1 formed by the upstream charger 31 when the upstream grid voltage Vg (U) is set in the step S109. Namely, the control flow shifts to the charging process by the downstream charger 32 at the step S110.

5-2. Charging Process and Surface Potential Control by Downstream Charger

Next, the charging process by the downstream charger 32 will be described. In the downstream charger 32, a predetermined downstream grid voltage Vg (S) is applied to the downstream grid electrode 32*b* from the downstream grid power supply S5, and a downstream discharge current (DC current) Ip (S) flows from the downstream discharge power supply S2 to the discharge wire 32*a*. This is done with the predetermined upstream grid voltage Vg (U) being applied to the upstream grid electrode 31*b* from the upstream grid power supply S4 of the upstream charger 31 and the upstream discharge current (DC current) Ip (U) flowing from the upstream discharge power supply S1 to the discharge wire 31$a$. In other words, the surface potential of the photosensitive drum 1 is formed by superimposing (combining) the charging process by the downstream charger 32 with the charging process by the upstream charger 31.

Similar to the upstream charger 31, the surface potential formed on the photosensitive drum 1 varies according to the downstream grid voltage Vg (S) of the downstream charger 32. The downstream grid voltage Vg (S) is adjusted and set such that the surface potential of the photosensitive drum 1 becomes the target potential (second target value). When the surface potential of the photosensitive drum 1 formed by the upstream charger 31 and the downstream discharge current Ip (S) are constant, the ratio of the upstream grid voltage Vg(S) to the surface potential of the photosensitive member at the potential detection position c is almost constant. This ratio is hereafter referred to as the downstream charging efficiency (charging efficiency Veff (S) of the downstream charger 32).

A specific example will be considered in which when the upstream grid voltage Vg (U) is −1000V and the upstream discharge current Ip (U) is −1200 μA, the surface potential of the photosensitive drum 1 is at −750V at the potential detection position c. Furthermore, when the downstream grid voltage Vg (S) is −1000V and the downstream discharge current Ip (S) is −1200 μA, the surface potential of the photosensitive drum 1 is −900V at the potential detection position c. Furthermore, assuming that the surface potential of the photosensitive drum 1 at the developing position d at this time is −850 V, the charging efficiency Veff (S) of the downstream charger 32 is the ratio of the downstream grid voltage Vg (S) (=−1000 V) to the surface potential (=−900 V) of the photosensitive drum 1 at the potential detection position c (=(surface potential of photosensitive drum at the potential detection position c)/(downstream grid voltage Vg (U)×100%)). Therefore, the charging efficiency Veff (S) of the downstream charger 32 is calculated to be 90% (=−900/−1000×100%).

Similar to the upstream charger 31, the charging efficiency Veff (S) of the downstream charger 32 varies according to the state of the charger, such as the distance (gap G) between the grid electrode 32$b$ and the photosensitive drum 1, and the surface resistance of the grid electrode 32$b$. In the short term, however, the charging efficiency Veff (S) is almost constant regardless of the upstream grid voltage Vg (S). Therefore, once the charging efficiency Veff (S) of the downstream charger 32 is measured, the data are stored in the storing portion 600. Using the data of the charging efficiency Veff (S), the downstream grid voltage Vg (U) is adjusted to set the surface potential of the photosensitive drum 1 to the target potential (second target value).

Figure 6:
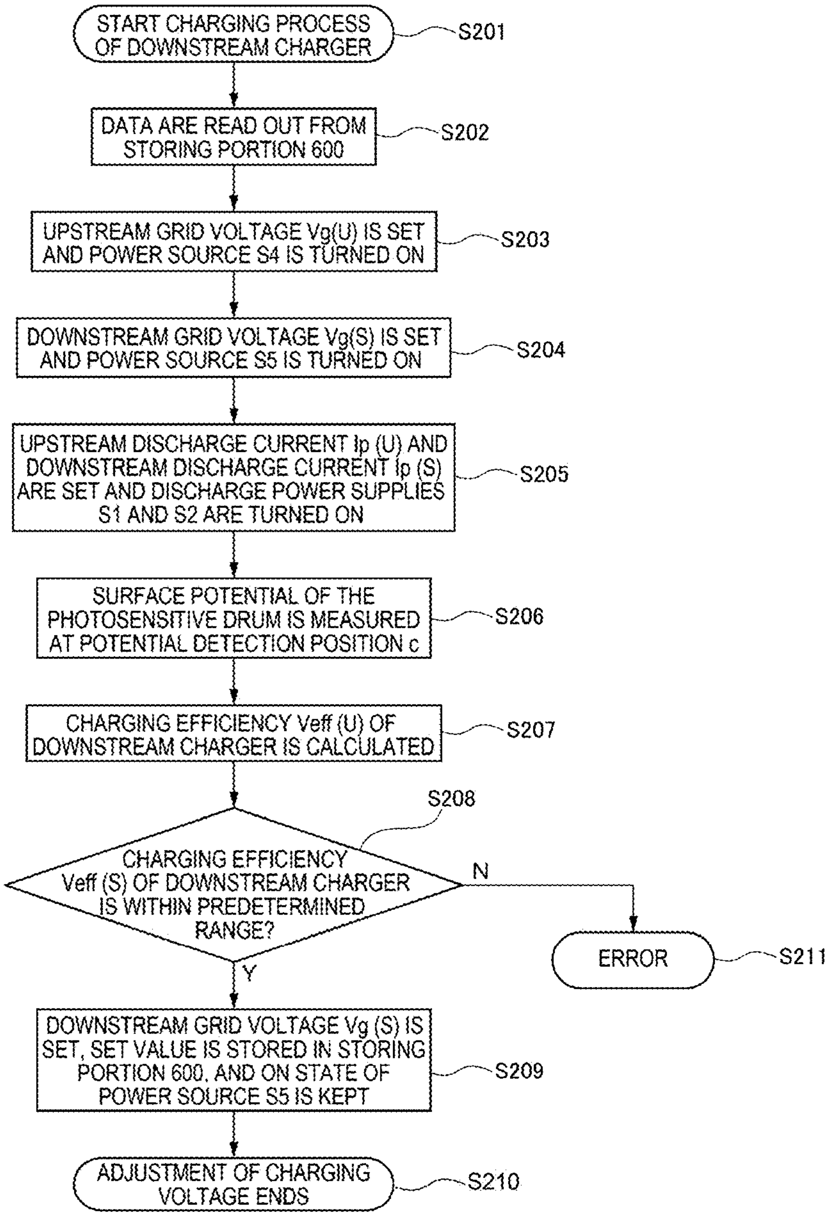
FIG. 6 is a flowchart showing a procedure of a control operation of a photosensitive drum surface potential by the downstream charger according to the Embodiment 1.

FIG. 6 is a flowchart for controlling the surface potential of the photosensitive drum 1 using the downstream charger 32. Immediately after the control of the surface potential of the photosensitive drum 1 using the upstream charger 31 (see FIG. 5) is performed, the control whose flow is described in FIG. 6 is performed. The adjustment of the surface potential of the photosensitive drum 1 to the target potential will be described below using FIG. 6. First, following the charging process by the upstream charger 31, the charging process of the downstream charger 32 starts (step S201). Since this is carried out following the control flow shown in FIG. 5, in this step, only the preparation for energizing the downstream charger 32 is performed by the CPU.

Next, in order to calculate the settings for the downstream charger 32, whether the past data of the charging efficiency Veff (S) of the downstream charger 32 are present in the storing portion 600 is checked. If the data are present, the latest charging efficiency Veff (S) of the downstream charger 32 and the grid voltage Vg (U) of the upstream charger 31 are readout (step S202). The value of the grid voltage Vg (U) of the upstream charger 31 has been determined in the step S109 of FIG. 5.

A value for charging efficiency is predetermined in order to properly perform the charging process of the downstream charger 32 for cases where the control has never been performed and the charging efficiency Veff (S) of the downstream charger 32 has not been stored in the storing portion 600.

The step S203 is not newly processed in the flow shown in FIG. 6, since it is a process that has been continued from the flow shown in FIG. 5 (the step S109 in this case).

The set value of the downstream grid voltage Vg(S) is determined by using the data read in the step S202 (step S204). For example, assuming that the target potential (second target value) of the photosensitive drum 1 of the downstream charger 32 in this embodiment is −900 V and the latest charging efficiency Veff (S) of the downstream charger 32=88%, the downstream grid voltage Vg (S) is calculated and set to be −1023V by using the equation: the downstream grid voltage Vg (S)=(the target potential of the photosensitive drum 1)/(the latest charging efficiency Veff (S) of the downstream charger×100%) (step S204).

The set value of the downstream grid voltage Vg (S) set in the step S204 is to be applied during image formation and is different from the set value of the downstream grid voltage to be set to prevent leakage phenomenon in the step S104 in FIG. 5.

Figure 7:
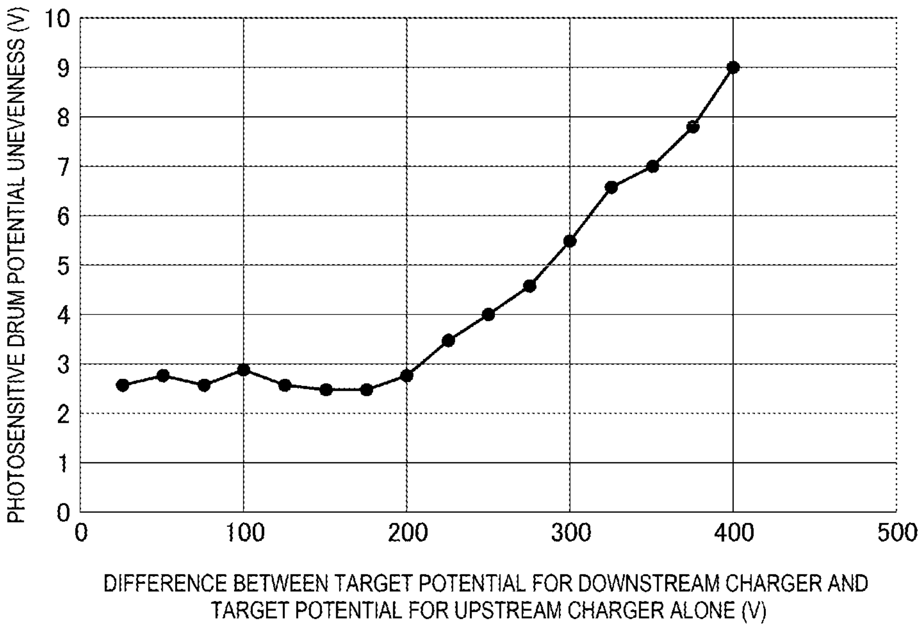
FIG. 7 is a graph showing a relationship between charging voltages of the upstream charger and the downstream charger, and the photosensitive drum surface potential according to the Embodiment 1.

The absolute value of the difference between the absolute value of the target potential (first target value) formed on the photosensitive drum in the charging process by the upstream charger 31 alone and the absolute value of the target potential (second target value) formed on the photosensitive drum 1 in the charging process by the downstream charger 32 superimposed on the charging process by the upstream charger 31, is determined as follows. FIG. 7 is a graph showing the relationship between the difference in the target potential of the photosensitive drum 1 of the upstream charger 31 and the downstream charger 32 and the uneven surface potential of the photosensitive drum 1. FIG. 7 shows that when the difference between the surface potential of the photosensitive drum 1 formed by the upstream charger 31 alone and the surface potential of the photosensitive drum 1 charged by superimposing (combining) the surface potential of the photosensitive drum 1 formed by the upstream charger 31 with the downstream charger 32 is less than 200V, unevenness of the surface potential of the photosensitive drum 1 is within the target potential ±3 V (within a predetermined potential range), which is in a good condition.

This means that if the photosensitive drum is further charged in the downstream charger 32 so that the surface potential is greater by more than 200 V in absolute value than the surface potential of the photosensitive drum charged by the upstream charger 31, the uneven surface potential of the photosensitive drum cannot be uniformly charged with the charging capacity of the downstream charger 32 and the uneven surface potential is worsened. Conversely, it is considered that if the photosensitive drum is further charged by the downstream charger 32 so that the surface potential is less by 200 V or less than the surface potential charged only by the upstream charger 31, the surface potential of the photosensitive drum can be made uniform and the unevenness of the surface potential of the photosensitive drum is improved.

Thus, in the image forming apparatus for this embodiment, the absolute value of the difference between the absolute value of the surface potential (target potential) of the photosensitive drum formed in the charging process by the upstream charger 31 and the absolute value of the surface potential (target potential) of the photosensitive drum formed when the charging process of the downstream charger 32 is added is 200 V or less.

The unevenness of the surface potential of the photosensitive drum is improved more when the difference between the target potentials of the photosensitive drum 1 of the upstream charger 31 and the downstream charger 32 is smaller, but the absolute value of the surface potential at the longitudinal positions other than the potential detection position c may be larger than the potential detection position c. This is due to the longitudinal distance distribution between the chargers and the photosensitive drum and the longitudinal dimensional distribution of the grid electrodes and longitudinal dirt distribution. If this situation becomes conspicuous, the surface potential of the photosensitive drum 1 formed by the upstream charger 31 becomes higher than the absolute value of the target potential of the downstream charger 32, losing the charging effect of the downstream charger 32, which leads to the deterioration of the uneven surface potential of the photosensitive drum. Therefore, in this embodiment, the absolute value of the difference between the target potential of the photosensitive drum 1 of the upstream charger 31 and the target potential of the photosensitive drum 1 of the downstream charger 32 is set to be 150 V, which is less than 200 V.

If the grid electrode 31*b* or the discharge wire 31*a* of the upstream charger 31 becomes dirty, a difference in surface potential in the longitudinal direction will be generated. Considering also such a case, the absolute value of the difference between the target potential of the photosensitive drum 1 by the upstream charger 31 and the target potential of the photosensitive drum 1 by the downstream charger 32 is set at 150 V. As a result, even if uneven surface potential of the photosensitive drum occurs in the upstream charger 31 due to dirt on the grid electrode 31*b* and the discharge wire 31*a*, the downstream charger 32 can uniformly charge the drum with almost no uneven surface potential of the upstream charger 31.

Figure 8:
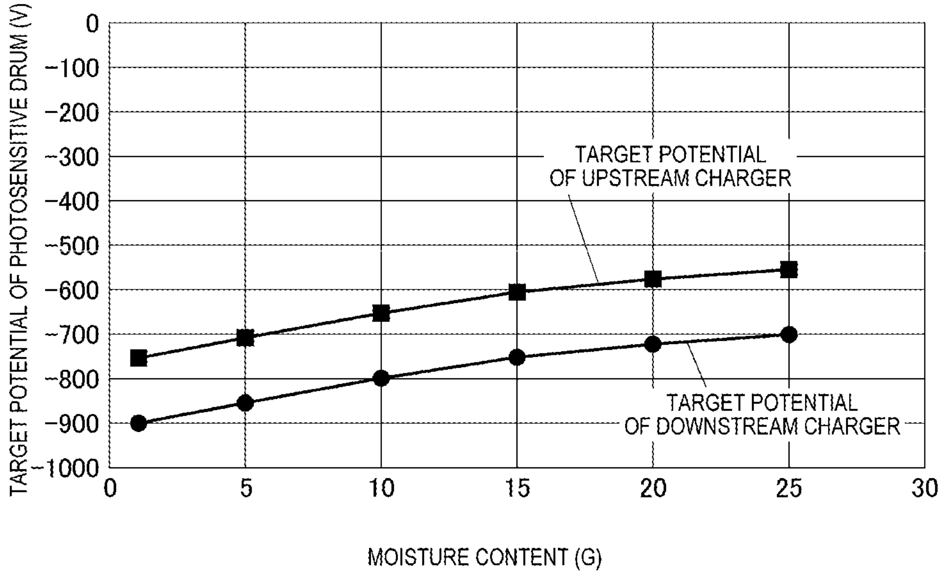
FIG. 8 is a graph showing a relationship between a surface potential formed by the upstream charger and a surface potential formed by the downstream charger according to Embodiment 1.

FIG. 8 is a graph showing the relationship between the target potential (first target value) of the photosensitive drum of the upstream charger 31 and the target potential (second target value) of the photosensitive drum of the downstream charger 32 superimposed on the charging by the upstream charger 31, depending on the installation environment (moisture content) of the image forming equipment. As shown in FIG. 8, the target potential of the photosensitive drum 1 is adjusted according to the moisture content detected by the image forming apparatus. When the moisture content is low, the absolute value of the target potential of the photosensitive drum is increased, and as the moisture content increases, the absolute value of the target potential of the photosensitive drum is decreased. The target value of the photosensitive drum with respect to moisture content is determined by the charging amount of the developer. The absolute value of the difference between the absolute value of the target potential of the upstream charger 31 of the photosensitive drum and the absolute value of the target potential of the photosensitive drum of the downstream charger 32 charged superimposed on the charging by the upstream charger 31 is a constant 150 V regardless of moisture content for the reasons mentioned above.

Thus, in this embodiment, the absolute value of the difference between the absolute value of the target potential of the photosensitive drum formed by the charging process by the upstream charger 31 and the absolute value of the target potential of the photosensitive drum formed by the downstream charger 32 is constant regardless of the environment in which the image forming apparatus is installed.

The absolute value of the difference between the absolute value of the target potential of the photosensitive drum by the upstream charger 31 and the absolute value of the target potential of the photosensitive drum by the downstream charger 32 superimposed on the charging by the upstream charger 31 may not be configured to be a constant value of 150 V regardless of moisture content. The target potentials may be determined such that the ratio of the absolute value of the target potential of the upstream charger 31 of the photosensitive drum to the absolute value of the target potential of the downstream charger 32 superimposed on the charging by the upstream charger 31 is 8:2, for example.

The upstream discharge current Ip (U) of the upstream charger 31 and the downstream discharge current Ip (S) of the downstream charger 32 are set to −1200 μA, and the discharge power supplies S1 and S2 are turned on (step S205).

With the power supplies S1, S2, S4 and S5 turned on at the above settings for the discharge wires 31*a* and 32*a* and the grid electrodes 31*b* and 32*b* in the chargers 31 and 32, the surface potential of the photosensitive drum 1 is measured at the potential detection position c by the potential sensor 5 (step S206). As a result, for example, the surface potential of the photosensitive drum at the potential detection position c is measured to be −921 V.

In this state, the charging efficiency Veff (S) of the downstream charger 32 is calculated (step S207) by the following equation: the charging efficiency Veff (S)=(the surface potential of the photoconductor at the potential detection position c)/(the downstream grid voltage Vg (S)×100%). Then, the charging efficiency Veff (S) of the downstream charger 32 is obtained as 90% by the calculation: −921/−1023×100%.

Next, the judgment of an error due to malfunction is made (step S208) based on whether the calculated charging efficiency Veff (S) of the downstream charger 32 is within a predetermined range (75 to 100% in this embodiment). Since the surface potential of the downstream charger 32 is judged by the surface potential formed by the charging process of the downstream charger 32 superimposed by the charging process of the upstream charger 31, the error determination ranges for the upstream charger 31 and downstream charger 32 are different. If the charging efficiency Veff (S) of the downstream charger 32 is less than 75% or greater than 100%, it is assumed that one of the charging device 3, the photosensitive drum 1, and the exposure device 10 malfunctions. Therefore, if the charging efficiency Veff (S) of the downstream charger 32 falls outside the range of 75 to 100% in the step S208, the error judgment condition is met and the control of the surface potential of the photosensitive drum 1 is stopped, and the error is displayed on the user interface of the image forming apparatus 100 (step S211). Similar to the operations in the upstream charger, by performing the error judgment at the step S208, it is possible to prevent the power supply from being damaged by setting too large an absolute value for the grid electrode and to prevent defective images from being generated due to the surface potential of the photosensitive drum being set to an inappropriate value.

Next, the downstream grid voltage Vg (S) is calculated for setting to −900 V the target potential of the photosensitive drum 1 of the downstream charger 32 whose charging process is superimposed on the charging process of the upstream charger 31 using the charging efficiency Veff (S) (=90%) of the downstream charger 32 calculated at the step S207. The value of the downstream grid voltage Vg (S) is obtained as −1000 V by the calculation: −900/(90/100) using the equation: the downstream grid voltage Vg (S)=(the target potential of the photosensitive drum 1)/(the latest charging efficiency Veff (S) of the downstream charger/100%) (step S209). In the step S209, the downstream grid voltage Vg (S) is reset to the value calculated as described above. The reset value of the upstream grid voltage is stored in the storing portion 600. At this time, the power supply S5 remains ON. In this way, the set values of the downstream discharge current Ip (S) and the downstream grid voltage Vg (S) of the downstream charger 32 are determined subsequent to the upstream charger 31. Then, the adjustment of the charging voltage ends (step S210).

Similar to the case of the step S109 in FIG. 5, the step to check if the downstream grid voltage Vg (S) set in the step S209 conforms to the target potential of the photosensitive drum 1 formed by the downstream charger 32 may be included in the control flow.

The above is the control flow of the controlling the surface potential of the photosensitive drum by the upstream charger 31 and the downstream charger 32. Following this control flow, the setting values of the exposure device 10 may also be determined.

Image formation is performed using the grid voltages Vg and the discharge currents Ip of the discharge wires in the chargers 31 and 32 and the settings of the exposure device 10 determined by the above control flows.

6. Timing of Charging Voltage Adjusting Operation

Next, the timing of the adjusting operations of the charging voltages for chargers in this embodiment will be described. The adjusting operations for adjusting the charging voltages of chargers are indicated in the control flows for controlling the surface potential (control flows in FIGS. 5 and 6) described in the above sections 5-1 and 5-2, respectively.

In this embodiment, the CPU 200 as a controller controls the adjusting operations of the charging voltages in the following procedure and timing. The CPU 200 performs the adjusting operations of the charging voltages of respective chargers to be performed at a predetermined timing during non-image formation time periods.

The image formation time periods are the ones during which the image to be output to the recording material P is formed (formation of the electrostatic latent image and toner image and transferring of toner image). On the other hand, the non-image formation time periods are the ones other than the image forming time periods. The non-image forming time periods include the following periods.

First, the non-image forming time periods include the time period for the preparatory multi-rotation process, which is a preparatory operation when the power of the image forming apparatus 100 is turned on or returns from sleep mode. Secondly, the non-image forming time periods include the time period for the preparatory rotation process, which is a preparatory operation from the time when an image forming start instruction is input until the time when the aforementioned image actually starts to be formed. Thirdly, the non-image forming time period include the time period for the sheet interval process, which corresponds to the time period between two or more recording materials P in a job (a series of operations in which images are formed on single or multiple recording materials and output according to a single image forming start instruction) in which images are continuously formed on multiple recording materials P. Lastly, the non-image forming time periods include the time period for the post rotation process, which is a preparatory operation after the image is formed.

In this embodiment, the CPU 200 can acquire pieces of information on the result of counting the number of image outputs by the sheet number counter 300, the result of measuring elapsed time by the timer 400, and the result of detecting at least one of temperature and humidity by the environmental sensor 500. Based on at least one of these pieces of information, the CPU 200 can then determine the aforementioned predetermined timing for performing the charging voltage adjusting operation for each charger.

For example, if the number of image outputs since the previous execution of the charging voltage adjusting operation reaches a predetermined number, the charging voltage adjusting operation can be performed in the next preparatory rotation process. If the number of image outputs reaches a predetermined number during job execution, the charging voltage adjusting operation may be performed during the sheet interval process. Further, instead of or in addition to the charging voltage adjusting operation based on the number of image outputs, a charging voltage adjusting operation may be performed based on the time elapsed since the previous execution of the charging voltage adjusting operation. Furthermore, instead of or in addition to the charging voltage adjusting operation based on the number of image outputs and the elapsed time, a charging voltage adjusting operation may be performed when at least one of the temperature and humidity of the environment has changed beyond a predetermined threshold value.

As described above, the photosensitive drum 1 is charged more uniformly to the target surface potential by the plurality of corona chargers 31, 32 by the CPU 200 performing the charging voltage adjusting operation of each charger at a predetermined timing during non-image formation. In particular, even when the moving speed of the photosensitive drum 1 is increased or the photosensitive drum 1 with relatively large capacitance is used, the multiple corona chargers 31, 32 enable the photosensitive drum 1 to be charged more uniformly to the target surface potential.

In this embodiment, the voltage applied to each of the multiple corona chargers 31, 32 can be controlled independently. In this embodiment, the charging voltage adjusting operation is performed by independently controlling the voltage applied to multiple corona chargers 31, 32 in the order from the upstream side to the downstream side to superimpose (combine) the surface potentials formed on the photosensitive drum 1 in sequence. In particular, during the charging voltage adjusting operation by the upstream charger 31, unintended charge transfer between the downstream charger 32 and the photosensitive drum 1 can be prevented by applying a grid voltage to the adjacent downstream charger 32. This allows the final surface potential of the photosensitive drum 1 to be controlled to the desired potential by independently setting the voltage applied to each charger 31, 32. In addition, unevenness of charging of the surface potential of the photosensitive drum 1 can be suppressed.

Embodiment 2

Next, another embodiment of the present invention will be described. The basic configuration and operation of the image forming apparatus in this embodiment are the same as those in Example 1. Therefore, elements of the image forming apparatus in this embodiment that have the same or corresponding functions or configurations as those of the image forming apparatus in Example 1 will be given the same symbols, and detailed descriptions are omitted.

The charging device 3 of the image forming apparatus in Example 1 has two corona chargers whose applied voltages can be independently controlled to perform charging of the photosensitive drum 1. The charging device 3 of the image forming apparatus in Example 2 performs charging of the photosensitive drum 1 by means of three corona chargers. Each voltage to be applied to them can be independently controlled. This improves the charging performance of the charging device 3 and allows to obtain a uniform surface potential of the photosensitive drum 1 even when the moving speed of the photosensitive drum 1 is further increased.

Figure 9:
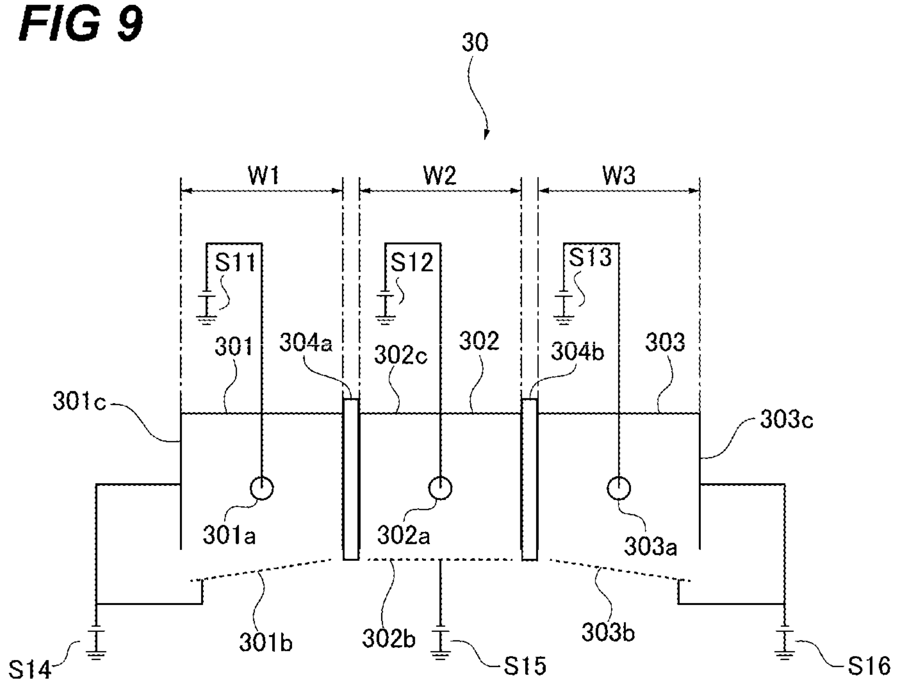
FIG. 9 is a schematic sectional view of an image forming apparatus according to Embodiment 2.

FIG. 9 is a schematic sectional view of the charging device 30 in this embodiment. The charging device 30 of this embodiment has a plurality of corona chargers. More specifically, the charging device 30 is constituted by the upstream charger 301, the middle charger 302, and the downstream charger 303 which are scorotron chargers. With respect to the rotational direction of the photosensitive drum 1, the upstream charger 301, the middle charger 302, and the downstream charger 303 are disposed from the upstream side toward the downstream side in this order. The upstream charger 301, the middle charger 302, and the downstream charger 303 have substantially the same configuration as each other. The upstream charger 301, the middle charger 302, and the downstream charger 32 respectively have discharge wires (wire electrodes, discharge electrodes) 301*a*, 302*a* and 303*a*, the grid electrodes 301*b*, 302*b* and 303*b*, and the shield electrodes 301*c*, 302*c* and 303*c*. Incidentally, in the following description, elements and various parameters for each of the upstream charger 301, the middle charger 302, and the downstream charger 303 are distinguished from each other by adding the prefix "upstream", "middle" or "downstream" in some cases.

In the charging device 30 in this embodiment, the upstream charger 301 is a first corona charger that charges the photosensitive drum 1 at the first position. The middle charger 302 is a second corona charger that charges the photosensitive drum 1 at the second position adjacent to and downstream of the first position in the direction of rotation of the photosensitive drum 1. The downstream charger 303 is a third corona charger that charges the photosensitive drum 1 at the third position adjacent to and downstream of the second position in the direction of rotation of the photosensitive drum 1.

The discharge wires 301*a*, 302*a* and 303*a*, the grid electrodes 301*b*, 302*b* and 303*b*, and the shield electrodes 301*c*, 302*c* and 303*c* are configured in the same manner as those of the charging device 3 in Example 1, respectively. In this embodiment, the insulating members 304*a* and 304*b* are located between the upstream charger 301 and the middle charger 302, and between the middle charger 302 and the downstream charger 303, respectively. The insulating members 304*a*, 304*b* are configured in the same manner as that of the charging device 3 in Example 1.

As shown in FIG. 9, each of the upstream grid electrode 301*b*, the middle grid electrode 302*b*, and the downstream grid electrode 303*b* is disposed along the circumference of the photosensitive drum 1 such that those grid electrodes have different angles (inclination angles). Similar to Embodiment 1, in a cross-section substantially perpendicular to the longitudinal direction of the photosensitive drum 1, an arrangement angle of each of the grid electrodes 301*b*, 302*b* and 303*b* is a substantially right angle with respect to a straight line connecting the corresponding discharge wire 301*a*, 302*a* or 303*a* with the rotation center of the photosensitive drum 1. Similar to Embodiment 1, the chargers 301, 302 and 303 have respectively the widths W1, W2 and W3 that are of the same value of 20 mm with each other with respect to the tangential direction of the photosensitive drum 1. The grid electrodes 301*b*, 302*b* and 303*b* have a common aperture ratio of 85%. By using common grid electrodes 301*b*, 302*b* and 303*b*, the number of kinds of the parts to be maintained can be reduced.

With the above configuration, the charging device 30 of this embodiment can uniformly charge the photosensitive drum 1 even when the peripheral speed of the photosensitive drum 1 is 1000 mm/s.

As shown in FIG. 9, the upstream discharge wire 301*a*, the middle discharge wire 302*a*, and the downstream discharge wire 303*a* are connected to the upstream discharge power supply S11, the middle discharge power supply S12, and the downstream discharge power supply S13, respectively, which are DC power supplies (high-voltage power supplies), so that voltages applied to the discharge wires 301*a*, 302*a* and 303*a* can be independently controlled.

The upstream grid electrode 301*b*, the middle grid electrode 302*b* and the downstream grid electrode 303*b* are connected to the upstream grid power supply S14, the middle grid power supply S15, and the downstream grid power supply S16, respectively, which are DC power supplies, so that voltages applied to the grid electrodes 301*b*, 302*b* and 303*b* can be independently controlled.

In this embodiment, the upstream discharge power supply S11, the middle discharge power supply S12, and the downstream discharge power supply S13, the upstream grid power supply S14, the middle grid power supply S15, and the downstream grid power supply S16 as voltage applying portions are configured as separate power supplies. However, the invention is not limited to this configuration and one single power supply that provides the voltages to be applied to the upstream discharge wire 301*a*, the middle discharge wire 302*a*, and the downstream discharge wire 303*a*, and the voltages to be applied to the upstream grid electrode 301*b*, the middle grid electrode 302*b*, and the downstream grid electrode 303*b* can be used if these voltages are independently controlled.

The upstream shield electrode 301*c*, the middle shield electrode 302*c*, and the downstream shield electrode 303*c* are connected with the upstream grid electrode 301*b*, the middle grid electrode 302*b*, and the downstream grid electrode 303*b*, respectively. Therefore, in this embodiment, in the chargers 301, 302 and 303, the shield electrodes 301*c*, 302*c* and 303*c* respectively have the same potentials as those of the grid electrodes 301*b*, 302*b* and 303*b*. However, similar to Embodiment 1, this invention is not limited to this configuration.

Figure 10:
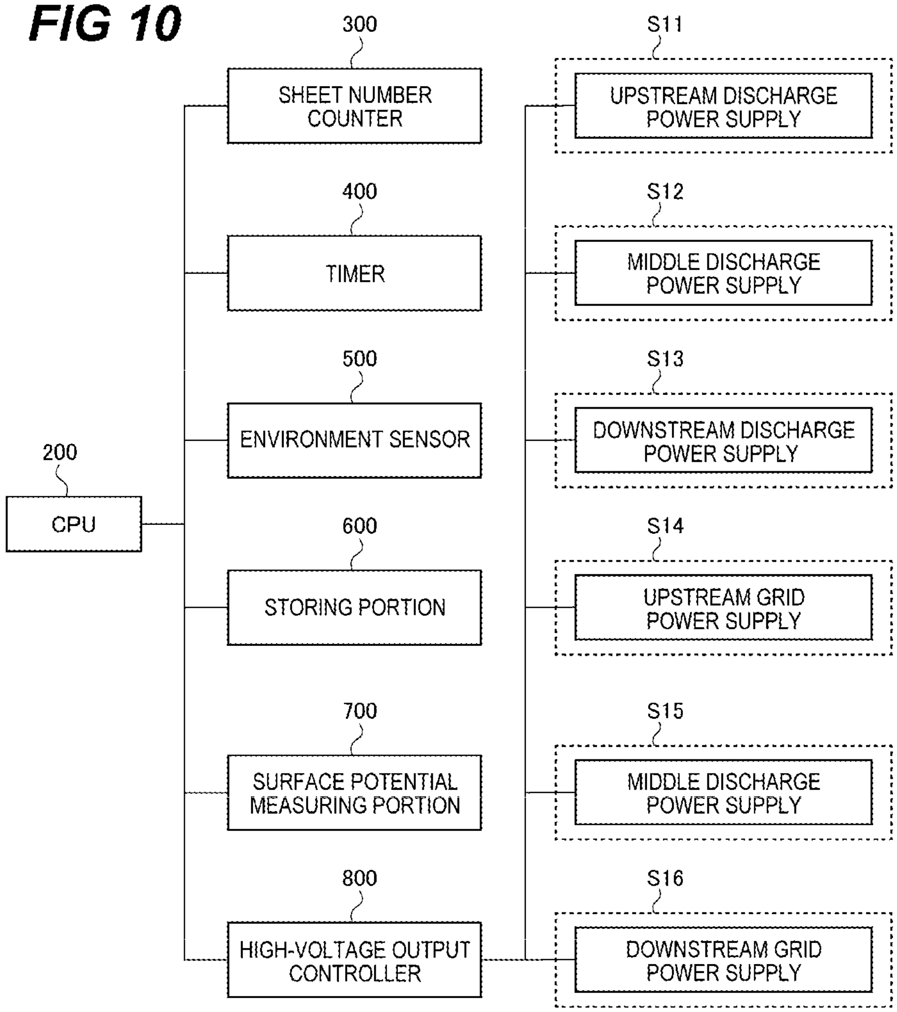
FIG. 10 is a block diagram of a control circuit for controlling a charging voltage according to the Embodiment 2.

FIG. 10 is a block diagram showing the control of the charging voltages in this embodiment. As shown in FIG. 10, the power supplies S11, S12, S13, S14, S15 and S16 are connected to the CPU 200 as a controller. Further, similar to Embodiment 1, the sheet number counter 300, the timer 400, the environment sensor 500, the storing portion 600, the surface potential measuring portion 700, the high-voltage output controller 800 and the like are connected to the CPU 200. The surface potential measuring portion 700 processes a detection result of the potential sensor 5 (sensor output) and provides the CPU 200 with information showing the measurement result. The high-voltage controller 800 controls ON/OFF of the outputs of the power supplies S11, S12, S13, S14, S15 and S16 and the output values of these power supplies under control of the CPU 200.

The CPU 200 performs the processing described later on the basis of pieces of information from the sheet number counter 300, the timer 400, the environment sensor 500, the storing portion 600 and the surface potential measuring portion 700, and provides instructions to the high-voltage output controller 800 to control the power supplies S11, S12, S13, S14, S15 and S16.

In this embodiment, the charging device 3 sequentially performs the charging process for the photosensitive drum 1 in the order of the upstream charger 301, the middle charger 302, and the downstream charger 303 to form the surface potential on the photosensitive drum 1 in a superimposing (composing) manner. Since there are three corona chargers, the operation to independently set the voltage applied to each corona charger is increased by one time compared to Embodiment 1 in the operation to adjust the surface potential of the charging voltage. First, the adjusting operation of the surface potential of the upstream charger 301 is performed. Subsequently, the adjusting operation of the surface potential of the middle charger 302 is performed by superimposing the surface potential formed by the upstream charger 301. Subsequently, the adjusting operation of the surface potential of the downstream charger 303 is performed by superimposing the surface potential formed by the upstream charger 301 and the middle charger 302.

The surface potential formed on the photosensitive drum 1 by each of the chargers 301, 302 and 303 is basically controlled by the same procedure as in Embodiment 1 to finally control the target surface potential of the photosensitive drum 1. The surface potential formed on the photosensitive drum 1 by a corona charger upstream of the two adjacent corona chargers should be equal to or less than the grid voltage of a corona charger downstream of the two adjacent corona chargers. It is further preferable that the absolute value of the difference between the absolute value of the surface potential formed on the photosensitive drum 1 by the corona charger upstream of the two adjacent corona chargers and the absolute value of the grid voltage of the corona charger downstream of the two adjacent corona chargers should be equal to or less than 200 V.

Next, the overall adjusting operation of the charging voltage in this embodiment will be described. The detailed procedure for adjusting the charging voltage in this embodiment will be omitted to avoid the repetitive description since the procedure described in Embodiment 1 can be applied.

First, when controlling the surface potential of the upstream corona charger, a value of 150 V less than the absolute value of the target potential of the upstream corona charger is set for the grid electrodes of the middle corona charger and the downstream corona charger and −600 μA is set for the discharge wire electrode.

That is, the CPU 200 first applies a voltage to the upstream charger 301 and performs the first adjusting operation to set the charging voltage of the upstream charger 301 so that the surface potential formed on the photosensitive drum 1 becomes the target potential (first target value). During this first adjusting operation, the CPU 200 applies a voltage to the upstream charger 301 and applies a voltage of a value smaller than the first target value to the middle charger 302 and the downstream charger 303, which are adjacent downstream of the upstream charger 301. The CPU 200 detects the surface potential of the photosensitive drum 1 by the potential sensor and sets a voltage to be applied to the upstream charger 301 based on the detection result.

This prevents an influence of charges leaking from the upstream corona charger to the middle corona charger and the downstream corona charger.

When subsequently controlling the surface potential of the middle corona charger, the set value of the high voltage for charge determined by the control procedure is used for the upstream corona charger, and the surface potential of the "intermediate" corona charger is superimposed on it. In this case, a value of 150 V less than the absolute value of the target potential of the upstream corona charger is set to the grid electrode of the downstream corona charger and −600 μA is set to the discharge wire electrode to perform the control of the surface potential of the middle corona charger. The absolute value of the grid electrode of the downstream corona charger can be a value that is 150 V less than the absolute value of the target potential of the upstream corona charger or a value that is 150 V less than the absolute value of the target potential of the middle corona charger.

That is, the CPU 200 subsequently applies a voltage to the middle charger 302 and performs the second adjusting operation for setting a charging voltage of the middle charger 302 so that the surface potential formed on the photosensitive drum 1 becomes the target potential (second target value) by superimposing the charging process of the middle charger 302 with the charging process of the upstream charger 301, in which the conditions set in the first adjusting operation are used. During this second adjusting operation, the CPU 200 applies a voltage to the middle charger 302 and also applies to the downstream charger 303 adjacent to and downstream of the middle charger 302 a voltage that is smaller than the second target value mentioned above. Then, the CPU 200 detects the surface potential of the photosensitive drum 1 with the potential sensor and sets the voltage applied to the middle charger 302 based on the detection result.

This prevents the influence of charge leaking from the upstream corona charger and the middle corona charger to the downstream corona charger.

That is, the CPU 200 subsequently applies a voltage to the downstream charger 302 and sets a voltage of the downstream charger 303 so that the surface potential formed on the photosensitive drum 1 becomes the target potential (third target value) by superimposing the charging process of the downstream charger 303 with the charging process of the upstream charger 301, in which the conditions set in the first adjusting operation are used, and with the charging process of the middle charger 302, in which the conditions set in the second adjusting operation are used.

By increasing the number of chargers in the charging device 3, the photosensitive drum 1 can be uniformly charged to the target surface potential even when the moving speed of the photosensitive drum 1 is further increased. In particular, when setting the charging voltage of the corona charger on the upstream side out of adjacent chargers, unintended charge transfer between the corona charger on the downstream side and the photosensitive drum can be prevented by applying a grid voltage to the corona charger on the downstream side. This allows the final surface potential of the photosensitive drum 1 to be controlled to the desired potential by independently setting the voltage applied to each charger. In addition, the unevenness of the charging of the photosensitive drum 1 can be suppressed.

Although the invention has been described in terms of above embodiments, the invention is not limited to them.

For example, in the above embodiments, the charging device was configured with a plurality of scorotron chargers. However, if the method of controlling the discharge current is adopted as in Example 1, the chargers other than the most downstream charger out of the chargers that the charging device has may be scorotron or corotron.

Although two or three corona chargers are used in the charging device of the above embodiments, four or more corona chargers can be used. In this case, as in the above embodiment, a voltage applied to each corona charger should be set so that as the surface potentials from the upstream corona charger to the downstream corona charger are sequentially formed and superimposed (combined) with each other, the formed surface potential becomes each target value While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-173089, filed Oct. 28, 2022, which is hereby incorporated by reference herein in its entirety.

What is claimed is:

1. An image forming apparatus comprising:

an image bearing member that is rotatable;

a charging device that charges the image bearing member by a plurality of corona chargers including a first corona charger and a second corona charger that is disposed downstream of the first corona charger with respect to a rotational direction of the image bearing member, the first corona charger including a first discharge electrode and a first grid electrode, the second corona charger including a second discharge electrode and a second grid electrode;

a first voltage applying portion that applies a voltage to the first grid electrode;

a second voltage applying portion that applies a voltage to the second grid electrode; and a controller that controls the first voltage applying portion and the second voltage applying portion, wherein the controller performs a first adjusting operation and thereafter the controller performs a second adjusting operation, wherein in the first adjusting operation, a voltage applied to the first grid electrode by the first voltage applying portion is set so that a surface potential of the image bearing member charged by the first corona charger becomes a first target value, the voltage applied to the first grid electrode by the first voltage applying portion being set in a state that a voltage is applied to the second discharge electrode and a voltage whose absolute value is less than the first target value is applied to the second grid electrode by the second voltage applying portion, and wherein in the second adjusting operation, a voltage applied to the second grid electrode by the second voltage applying portion is set so that a surface potential of the image bearing member charged by the first corona charger and the second corona charger becomes a second target value whose absolute value is greater than the first target value, the voltage applied to the second grid electrode by the second voltage applying portion being set in a state that a voltage is applied to the first discharge electrode and the voltage set by the first adjusting operation is applied to the first grid electrode by the first voltage applying portion.

2. The image forming apparatus according to claim 1, wherein the controller controls the second voltage applying portion in the first adjusting operation so that the second voltage applying portion applies such a voltage to the second grid electrode that the second grid electrode becomes in a state as if the second grid electrode were grounded to earth.

3. The image forming apparatus according to claim 1, wherein the absolute value of the difference between the absolute value of the first target value and the absolute value of the second target value is 200 volts or less.

4. The image forming apparatus according to claim 1, wherein an aperture ratio of the second grid electrode is less than that of the first grid electrode.

5. An image forming apparatus comprising:

an image bearing member that is rotatable;

a charging device that charges the image bearing member by a plurality of corona chargers including a first corona charger and a second corona charger that is disposed downstream of the first corona charger with respect to a rotational direction of the image bearing member, the first corona charger including a first discharge electrode and a first grid electrode, the second corona charger including a second discharge electrode and a second grid electrode;

a developing device having a developing container that accommodates developer, and a developer bearing member that bears the developer for developing an electrostatic latent image formed on the image bearing member;

a detecting portion that detects a surface potential of the image bearing member, the detecting portion being disposed downstream of a charging position where the image bearing member is charged by the charging device and upstream of a developing position where the electrostatic latent image formed on the image bearing member is developed by the developing device with respect to the rotational direction of the image bearing member;

a first voltage applying portion that applies a voltage to the first grid electrode;

a second voltage applying portion that applies a voltage to the second grid electrode; and a controller that controls the first voltage applying portion and the second voltage applying portion, wherein the controller performs a first adjusting operation and thereafter the controller performs a second adjusting operation, wherein in the first adjusting operation, a voltage applied to the first grid electrode by the first voltage applying portion is set based on the surface potential of the image bearing member detected by the detecting portion in a state that a voltage is applied to the second discharge electrode and a predetermined voltage is applied to the second grid electrode by the second voltage applying portion, wherein in the second adjusting operation, a voltage applied to the second grid electrode by the second voltage applying portion is set based on the surface potential of the image bearing member detected by the detecting portion in a state that a voltage is applied to the first discharge electrode and the voltage set by the first adjusting operation is applied to the first grid electrode by the first voltage applying portion, and wherein the absolute value of the predetermined voltage applied to the second grid electrode by the second voltage applying portion in the first adjusting operation is less than the absolute value of the voltage applied to the second grid electrode by the second voltage applying portion in the second adjusting operation.

6. The image forming apparatus according to claim 5, wherein the predetermined voltage is equal to such a voltage that the second grid electrode becomes in a state as if the second grid electrode were grounded to earth.

7. The image forming apparatus according to claim 5, wherein an aperture ratio of the second grid electrode is less than an aperture ratio of the first grid electrode.

* * * * *